US012451068B2

(12) United States Patent
Cho et al.

(10) Patent No.: US 12,451,068 B2
(45) Date of Patent: Oct. 21, 2025

(54) DISPLAY APPARATUS FOR VEHICLE

(71) Applicant: LG ELECTRONICS INC., Seoul (KR)

(72) Inventors: Sunghyun Cho, Seoul (KR); Sangwon Kim, Seoul (KR); Taehwan Kim, Seoul (KR); Chaeyoung Lee, Seoul (KR); Kyunglack Kim, Seoul (KR); Doyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/625,658

(22) Filed: Apr. 3, 2024

(65) Prior Publication Data

US 2024/0339078 A1 Oct. 10, 2024

(30) Foreign Application Priority Data

Apr. 4, 2023 (KR) ........................ 10-2023-0044329
Sep. 11, 2023 (KR) ........................ 10-2023-0120432

(51) Int. Cl.
*G09G 3/3233* (2016.01)

(52) U.S. Cl.
CPC ... *G09G 3/3233* (2013.01); *G09G 2300/0842* (2013.01); *G09G 2320/041* (2013.01); *G09G 2320/046* (2013.01); *G09G 2380/10* (2013.01)

(58) Field of Classification Search
CPC ... G09G 3/30–3291; G09G 2300/0842; G09G 2320/04–048
See application file for complete search history.

(56) References Cited

U.S. PATENT DOCUMENTS

2013/0293597 A1 11/2013 Mori et al.
2014/0168280 A1 * 6/2014 Lee ...................... G09G 3/3208 345/76

(Continued)

FOREIGN PATENT DOCUMENTS

FR 3094546 10/2020
KR 1020070093869 9/2007

(Continued)

OTHER PUBLICATIONS

European Patent Office Application Serial No. 24168030.5, Search Report dated Jun. 18, 2024, 10 pages.

*Primary Examiner* — Hang Lin
(74) *Attorney, Agent, or Firm* — LEE, HONG, DEGERMAN, KANG & WAIMEY

(57) ABSTRACT

A display apparatus for a vehicle is disclosed. A display apparatus for a vehicle according to an embodiment of the present disclosure includes: an organic light emitting diode (OLED) panel; a driving controller to output a driving signal; a first temperature detector in a first area of a rear surface of the OLED panel; a second temperature detector in a second area of the rear surface of the OLED panel; and a signal processing device to perform a first degradation compensation mode or a second degradation compensation mode based on a difference between a first temperature and a second temperature, wherein the signal processing device controls a luminance compensation value in the second degradation compensation mode to be greater than a luminance compensation value in the first degradation compensation mode. Accordingly, degradation may be reduced in an adaptive manner based on the temperature of each area of the panel.

20 Claims, 28 Drawing Sheets

(56) References Cited

U.S. PATENT DOCUMENTS

| | | | | |
|---|---|---|---|---|
| 2020/0211430 | A1* | 7/2020 | Kim | G09G 3/3233 |
| 2021/0375178 | A1* | 12/2021 | Luo | G09G 3/20 |
| 2022/0130332 | A1* | 4/2022 | Ok | G09G 3/3233 |

FOREIGN PATENT DOCUMENTS

| | | |
|---|---|---|
| KR | 1020200115897 | 10/2020 |
| KR | 1020210092309 | 7/2021 |
| KR | 1020220034298 | 3/2022 |
| WO | 2021234948 | 11/2021 |

* cited by examiner (a)

(b)

DISPLAY APPARATUS FOR VEHICLE

CROSS-REFERENCE TO RELATED APPLICATION(S)

Pursuant to 35 U.S.C. § 119, this application claims the benefit of earlier filing date and right of priority to Korean Application No(s). 10-2023-0044329, filed on Apr. 4, 2023, and 10-2023-0120432, filed on Sep. 11, 2023, the contents of which are all incorporated by reference herein in their entirety.

BACKGROUND

1. Field

The present disclosure relates to a display apparatus for a vehicle, and more particularly, to a display apparatus for a vehicle capable of reducing degradation in an adaptive manner based on the temperature of each area of a panel.

2. Description of the Related Art

A vehicle is a machine that allows a user who rides therein to move in a desired direction. A representative example of the vehicle is a car.

Meanwhile, for convenience of vehicle users, some vehicles are equipped with a display apparatus or device.

For example, a display is disposed in a cluster of a vehicle to display various types of information. In order to display vehicle driving information, various displays, such as an audio video navigation (AVN) display and a head-up display configured to output a projection image to a windshield, are increasingly being mounted in the vehicle, in addition to the cluster.

Meanwhile, due to its fast response time, an organic light emitting diode (OLED) panel has been widely used as a cluster display and an AVN display to display various types of information and the like.

However, when an OLED panel is employed in a vehicle display (or in-vehicle display), degradation such as burn-in is highly likely to occur.

SUMMARY

The preset disclosure describes a display apparatus for a vehicle capable of reducing degradation in an adaptive manner based on the temperature of each area of a panel.

The present disclosure also describes a display apparatus for a vehicle that can suppress or reduce degradation in an adaptive manner based on a pop-up mode or a pop-down mode of an organic light emitting diode (OLED) panel.

According to one aspect of the subject matter described in this application, there is provided a display apparatus for a vehicle, the display apparatus including: an organic light emitting diode (OLED) panel; a driving controller configured to output a driving signal to the OLED panel; a first temperature detector disposed in a first area of a rear surface of the OLED panel; a second temperature detector disposed in a second area of the rear surface of the OLED panel; and a signal processing device configured to perform a first degradation compensation mode or a second degradation compensation mode based on a difference between a first temperature detected by the first temperature detector and a second temperature detected by the second temperature detector, wherein the signal processing device is configured to control a luminance compensation value in the second degradation compensation mode to be greater than a luminance compensation value in the first degradation compensation mode.

The signal processing device may be configured to control a luminance compensation value of the first area in the second degradation compensation mode to be different from a luminance compensation value of the second area in the second degradation compensation mode.

The signal processing device may be configured to: perform the first degradation compensation mode in case in which a difference between a first temperature detected by the first temperature detector and a second temperature detected by the second detector is less than or equal to a reference value; and perform the second degradation compensation mode in case in which the difference is greater than the reference value.

The signal processing device may be configured to: perform the second degradation compensation mode in case in which a difference between the first temperature and the second temperature exceeds a reference value; and control a luminance compensation value of the second area in the second degradation compensation mode to be greater than a luminance compensation value of the first area in the second degradation compensation mode.

The signal processing device may be configured to: perform the second degradation compensation mode in case in which a difference between the first temperature and the second temperature exceeds a reference value and the second temperature is greater than the first temperature in a state in which a cumulative degradation amount of the first area is greater than a cumulative degradation amount of the second area; and control a luminance compensation value of the second area in the second degradation compensation mode to be greater than a luminance compensation value of the first area in the second degradation compensation mode.

The signal processing device may be configured to: perform the second degradation compensation mode in case in which a difference between the first temperature and the second temperature exceeds a reference value and the first temperature is greater than the second temperature; and control a luminance compensation value of the first area in the second degradation compensation mode to be greater than a luminance compensation value of the second area in the second degradation compensation mode.

The signal processing device may be configured to perform the first degradation compensation mode in case in which a difference between a first temperature detected by the first temperature detector and a second temperature detected by the second temperature is less than or equal to a reference value in a state in which the first area is in an ON mode and the second area is in an OFF mode displayed at a first luminance level.

In response to the first degradation compensation mode, the signal processing device may be configured to control the second area to be a second luminance level less than the first luminance level.

The signal processing device may be configured to perform the second degradation compensation mode in case in which a difference between a first temperature detected by the first temperature detector and a second temperature detected by the second temperature detector exceeds a reference value in a state in which the first area is in an ON mode and the second area is in an OFF mode displayed at a first luminance level.

In response to the second degradation compensation mode, the signal processing device may be configured to control the second area to be a third luminance level less than the first luminance level.

The signal processing device may be configured to: perform the second degradation compensation mode in case in which a difference between a first temperature detected by the first temperature and a second temperature detected by the second temperature exceeds a reference value and the second temperature is greater than the first temperature in a state in which the first area is in an ON mode and the second area is in an OFF mode displayed at a first luminance level; and control a luminance compensation value of the second area in the second degradation compensation mode to be greater than a luminance compensation value of the first area in the second degradation compensation mode.

The signal processing device may be configured to: perform the second degradation compensation mode in case in which a difference between the first temperature and the second temperature exceeds a reference value and the first temperature is greater than the second temperature in a state in which the first area is in an ON mode and the second area is in an OFF mode displayed at a first luminance level; and control a luminance compensation value of the first area in the second degradation compensation mode to be greater than a luminance compensation value of the second area in the second degradation compensation mode.

The signal processing device may be configured to perform the first degradation compensation mode in case in which the first area is in an ON mode and the second area is in an ON mode.

The signal processing device may be configured to control the OLED panel to be turned off in case in which a difference between a first temperature detected by the first temperature detector and a second temperature detected by the second temperature detector exceeds an allowable value in a state in which the first area is in an ON mode and the second area is in an OFF mode displayed at a first luminance level.

The display apparatus may further include a motor driver configured to adjust a height of the OLED panel.

The signal processing device may be configured to: perform the first degradation compensation mode in response to a pop-up mode in which the height of the light emitting diode panel is a first height; and perform the second degradation compensation mode in case in which a difference between the first temperature and the second temperature exceeds a reference value and the first temperature is greater than the second temperature in a pop-down mode in which the height of the OLED panel is a second height.

The signal processing device may be configured to control a luminance compensation value of the first area to be greater than a luminance compensation value of the second area in case in which a cumulative degradation amount of the first area is greater than a cumulative degradation amount of the second area while performing the first degradation compensation mode, and the signal processing device may be configured to control a luminance compensation value of the second area to be greater than a luminance compensation value of the first area in case in which a cumulative degradation amount of the second area is greater than a cumulative degradation amount of the first area while performing the first degradation compensation mode.

When performing the first degradation compensation mode or the second degradation compensation mode, the signal processing device may be configured to perform a pixel shift, a first direction line shift, or a second direction line shift.

When performing the first degradation compensation mode or the second degradation compensation mode, the signal processing device may be configured to perform luminance gradation processing on a third area including a boundary between the first area and the second area.

According to another aspect, there is provided a display apparatus for a vehicle, the display apparatus including: an organic light emitting diode (OLED) panel; a driving controller configured to output a driving signal to the OLED panel; a first temperature detector disposed in a first area of a rear surface of the OLED panel; a second temperature detector disposed in a second area of the rear surface of the OLED panel; a motor driver configured to adjust a height of the OLED panel; and a signal processing device configured to perform a first degradation compensation mode in response to a pop-up mode in which the height of the OLED panel is a first height, and, in a pop-down mode in which the height of the OLED panel is a second height, perform a second degradation compensation mode in case in which a difference between a first temperature detected by the first temperature detector and a second temperature detected by the second temperature detector exceeds a reference value and the first temperature is greater than the second temperature.

According to another aspect, there is provided a display apparatus for a vehicle, the display apparatus including: an organic light emitting diode (OLED) panel; a driving controller configured to output a driving signal to the OLED panel; a first temperature detector disposed in a first area of a rear surface of the OLED panel; a second temperature detector disposed in a second area of the rear surface of the OLED panel; a third temperature detector disposed in a third area of the rear surface of the OLED panel; and a signal processing device configured to perform a first degradation compensation mode or a second degradation compensation mode, based on a difference in respective temperatures detected by the first to third temperature detectors, wherein the signal processing device is further configured to control a luminance compensation value in the second degradation compensation mode to be greater than a luminance compensation value in the first degradation compensation mode.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
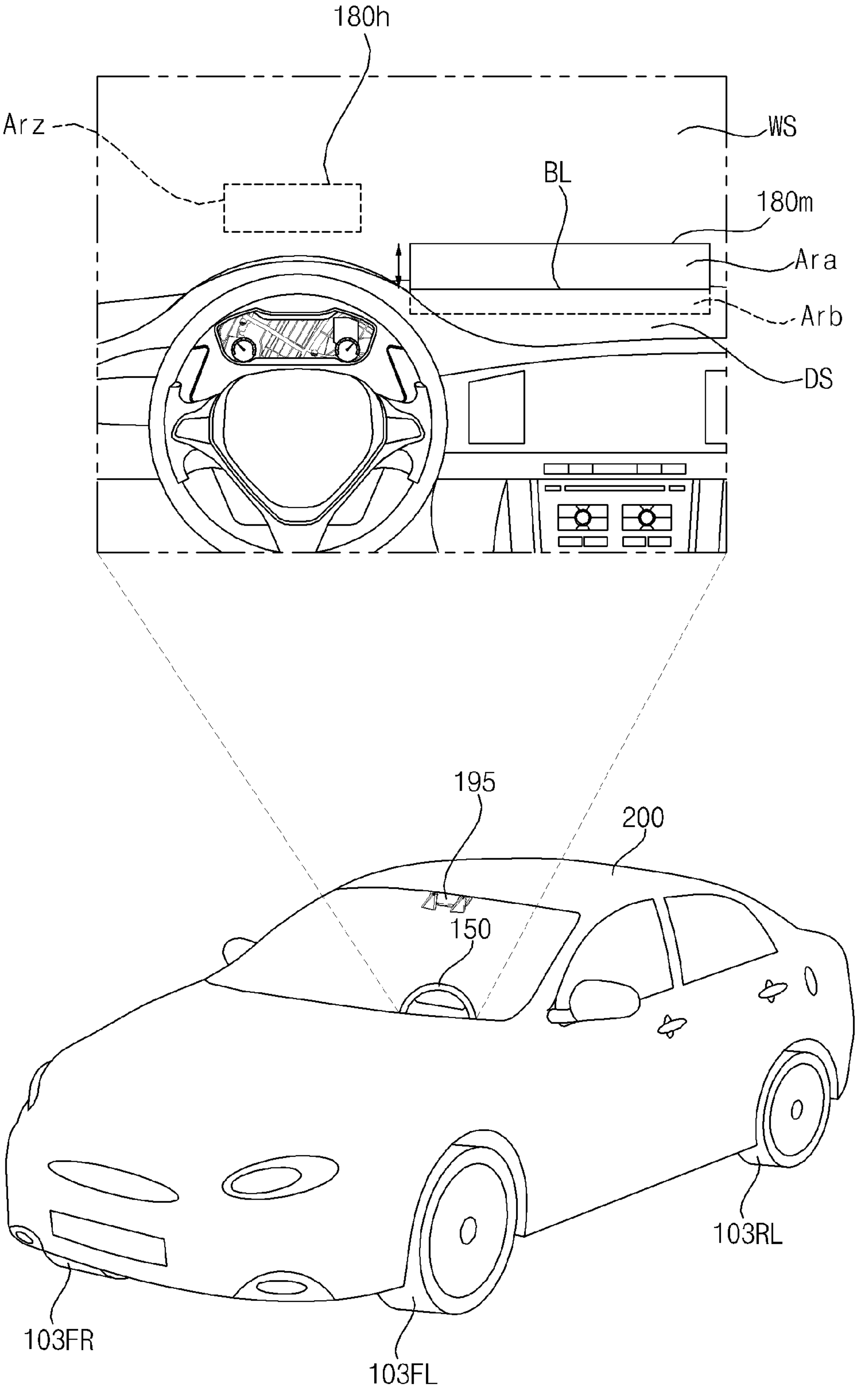
FIG. 1A illustrates an example of the exterior and interior of a vehicle.

FIG. 1A illustrates an example of the exterior and interior of a vehicle.

Referring to FIG. 1A, a vehicle 200 may include a plurality of wheels 103FR, 103FL, 103RL, . . . rotated by a power source and a steering wheel 150 configured to adjust a traveling direction of the vehicle 200.

The vehicle 200 may further include a camera 195 configured to acquire an image of the front of the vehicle.

The vehicle 200 may further include therein a plurality of displays 180*m* and 180*h* to display an image, information, and the like.

For example, as for the plurality of displays 180*m* and 180*h*, a first display 180*m* may be a cluster display or an audio video navigation (AVN) display, and a second display 180*h* may be a head-up display (HUD) configured to project an image in a predetermined area Ara of a windshield WS.

Meanwhile, a display apparatus for vehicle or vehicle display apparatus 100 (see FIG. 7) of the present disclosure is configured such that a first display 180*m*, of a plurality of displays 180*m* and 180*h*, includes an organic light emitting diode (OLED) panel.

In particular, the vehicle display apparatus 100 (see FIG. 6) according to an embodiment of the present disclosure includes an organic light emitting diode (OLED) panel 210 (see FIG. 6), a driving controller 285 (see FIG. 6) configured to output a driving signal to the OLED panel 210, a first temperature detector TSa (see FIG. 6) disposed in a first area Ara of a rear surface of the OLED panel 210, a second temperature detector TSb (see FIG. 6) disposed in a second area Arb of the rear surface of the OLED panel 210, and a signal processing device 170 (see FIG. 6) configured to perform a first degradation compensation mode or a second degradation compensation mode based on a difference between a first temperature detected by the first temperature detector TSa and a second temperature detected by the second temperature detector TSb.

Meanwhile, the signal processing device 170 controls a luminance compensation value in the second degradation compensation mode to be greater than a luminance compensation value in the first degradation compensation mode. This allows degradation to be reduced in an adaptive manner based on the temperature of each area of the OLED panel.

Meanwhile, the vehicle 200 described herein may be a concept including all of an internal combustion engine vehicle having an engine as a power source, a hybrid vehicle having an engine and an electric motor as power sources, and an electric vehicle having an electric motor as a power source.

Meanwhile, the first display 180*m* according to an embodiment of the present disclosure may be operated in a pop-up mode or a pop-down mode under the control of a motor driver 183.

For example, the first display 180*m* according to an embodiment of the present disclosure may be configured such that, in the pop-down mode, only a first area Ara thereof protrudes on a dashboard DS to display a first image in the first area Ara and, in the pop-up mode, the first area Ara and a second area Arb thereof protrude on the dashboard DS to display a second image in the first area Ara and the second area Arb.

Meanwhile, the vehicle display apparatus 100 (see FIG. 6) according to another embodiment of the present disclosure includes an organic light emitting diode (OLED) panel 210, a driving controller 285 configured to output a driving signal to the OLED panel 210, a first temperature detector TSa disposed in a first area Ara of a rear surface of the OLED panel 210, a second temperature detector TSb disposed in a second area Arb of the rear surface of the OLED panel 210, a motor driver 183 configured to adjust a height of the OLED panel 210, and a signal processing device 170 configured to perform a first degradation compensation mode in response to a pop-up mode in which the height of the OLED panel 210 is a first height hb, and, in a pop-down mode in which the height of the OLED panel 210 is a second height ha less than the first height hb, perform a second degradation compensation mode in case in which a difference between a first temperature and a second temperature exceeds a reference value and the first temperature is greater than the second temperature. This allows degradation to be reduced in an adaptive manner based on the temperature of each area of the panel.

Meanwhile, the first display 180*m* according to an embodiment of the present disclosure may be configured as a fixed type, instead of the pop-up mode or the pop-down mode, to be operated by being divided into a plurality of areas (or regions). This will be described below with reference to FIGS. 1B and 1C.

Figure 1B:
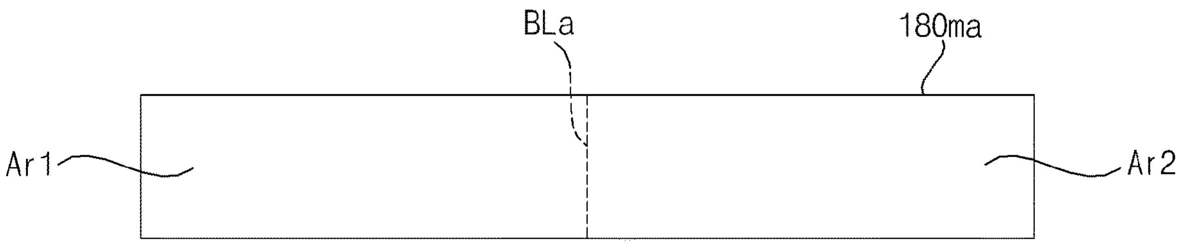
FIG. 1B and FIG. 1C illustrate various examples of a display.
Figure 1C:
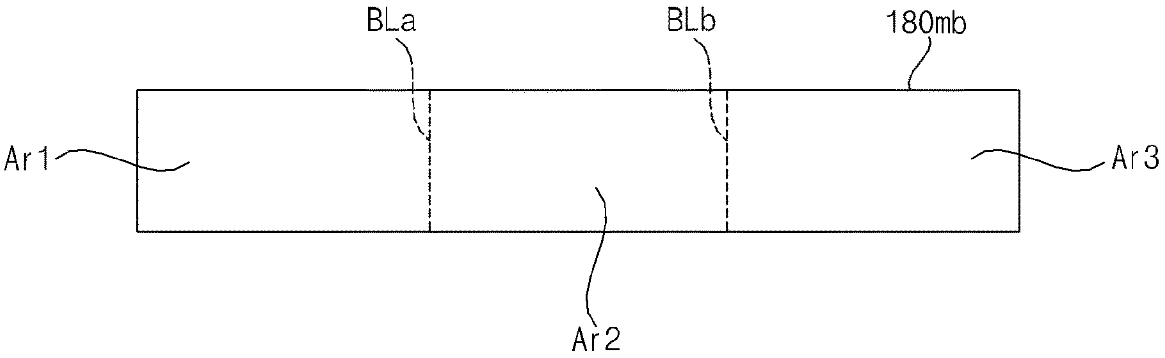

FIGS. 1B and 1C illustrate various examples of a display.

FIG. 1B illustrates a display according to another embodiment of the present disclosure.

Referring to FIG. 1B, a display 180*ma* of this embodiment may include, with respect to a boundary BLa, a first area Ar1 on the left side and a second area Ar2 on the right side.

The first area Ar1 may correspond to a cluster display area, and the second area Ar2 may correspond to an AVN display area.

Meanwhile, the vehicle display apparatus 100 (see FIG. 6) according to another embodiment of the present disclosure includes an organic light emitting diode (OLED) panel 210 (see FIG. 6), a driving controller 285 (see FIG. 6) configured to output a driving signal to the OLED panel 210, a first temperature detector TSa (see FIG. 6) disposed in a first area Ar1 of a rear surface of the OLED panel 210, a second temperature detector TSb (see FIG. 6) disposed in a second area Ar2 of the rear surface of the OLED panel 210, and a signal processing device 170 (see FIG. 6) configured to perform a first degradation compensation mode or a second degradation compensation mode based on a difference between a first temperature detected by the first temperature detector TSa and a second temperature detected by the second temperature detector TSb. This allows degradation to be reduced in an adaptive manner based on the temperature of each area of the panel.

FIG. 1C illustrates a display according to yet another embodiment of the present disclosure.

Referring to FIG. 1C, a display 180*mb* of this embodiment may include a first area Ar1 on the left side with respect to a first boundary BLa, a second area Ar2 on the right side with respect to the first boundary BLa, and a third area Ar3 on the right side with respect to a second boundary BLb.

The first area Ar1 may correspond to a cluster display area, the second area Ar2 may correspond to an AVN display area, and a third area Ar3 may correspond to a passenger seat display.

Meanwhile, the vehicle display apparatus 100 according to yet another embodiment of the present disclose includes an organic light emitting diode (OLED) panel 210, a driving controller 285 configured to output a driving signal to the OLED panel 210, a first temperature detector disposed in a first area Ar1 of a rear surface of the OLED panel 210, a second temperature detector disposed in a second area Ar2 of the rear surface of the OLED panel 210, a third temperature detector disposed in a third area Ar3 of the rear surface of the OLED panel 210, and a signal processing device 170 configured to perform a first degradation compensation mode or a second degradation compensation mode based on a difference in temperatures detected by the first to third temperature detectors. The signal processing device 170 controls a luminance compensation value in the second degradation compensation mode to be greater than a luminance compensation value in the first degradation compensation mode. This allows degradation to be reduced in an adaptive manner based on the temperature of each area of the panel.

Figure 2:
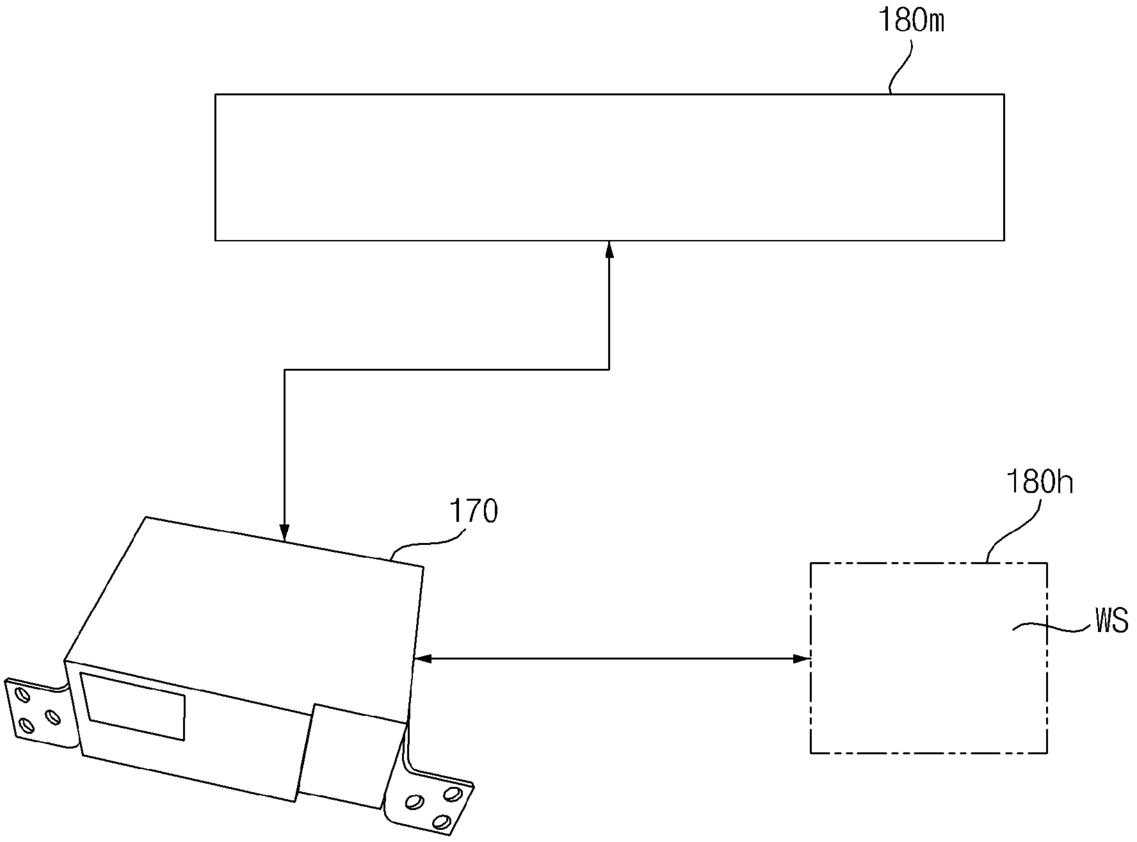
FIG. 2 illustrates the outer appearance of a display apparatus for vehicle according to an embodiment of the present disclosure.

FIG. 2 illustrates the outer appearance of a display apparatus for vehicle according to an embodiment of the present disclosure.

The vehicle display apparatus 100 according to an embodiment of the present disclosure may include a signal processing device 170 configured to perform signal processing to display an image and information on at least one of a plurality of displays 180*m* and 180*h*.

Of the plurality of displays 180*m* and 180*h*, a first display 180*m* may be a cluster display for displaying a driving state and operation information, or an audio video navigation (AVN) display for displaying vehicle driving information, a navigation map, and various types of entertainment information or images.

By contrast, a second display 180*h* may be a HUD display for displaying vehicle driving information.

The signal processing device 170 may include therein a memory 508 and a processor 175 to control at least one of the plurality of displays 180*m* and 180*h*.

Meanwhile, the signal processing device 170 may execute first to third virtual machines (not shown) on a hypervisor (not shown) in the processor 175.

The first virtual machine (not shown), which is a server virtual machine, may control the second virtual machine (not shown) and the third virtual machine (not shown), which are guest virtual machines.

Meanwhile, the second virtual machine may be referred to as a first guest virtual machine, and the third virtual machine may be referred to as a second guest virtual machine.

The first guest virtual machine (not shown) may be operated for the first display 180*m*, and the second guest virtual machine (not shown) may be operated for the second display 180*h*.

Meanwhile, the server virtual machine (not shown) in the processor 175 may be configured to set the memory 508 based on the hypervisor (not shown) for transmission of the same data to the first guest virtual machine (not shown) and the second guest virtual machine (not shown). Accordingly, the first display 180*m* and the second display 180*h* in the vehicle may display the same information or the same image in a synchronized manner.

Meanwhile, the server virtual machine (not shown) in the processor 175 may receive and process wheel speed sensor data of the vehicle so as to transmit the processed wheel speed sensor data to at least one of the first guest virtual machine (not shown) and the second guest virtual machine (not shown). Accordingly, at least one virtual machine may share the wheel speed sensor data of the vehicle.

Thus, the plurality of displays 180*m* and 180*h* may be controlled using a single signal processing device 170.

Meanwhile, one of the plurality of displays 180*m* and 180*h* may operate under a Linux-based operating system (OS), and the other may operate under a Web-based operating system (OS).

In some implementations, the signal processing device 170 may control the plurality of displays 180*m* and 180*h* operating under different operating systems (OS) to display the same information or the same image in a synchronized manner.

Figure 3:
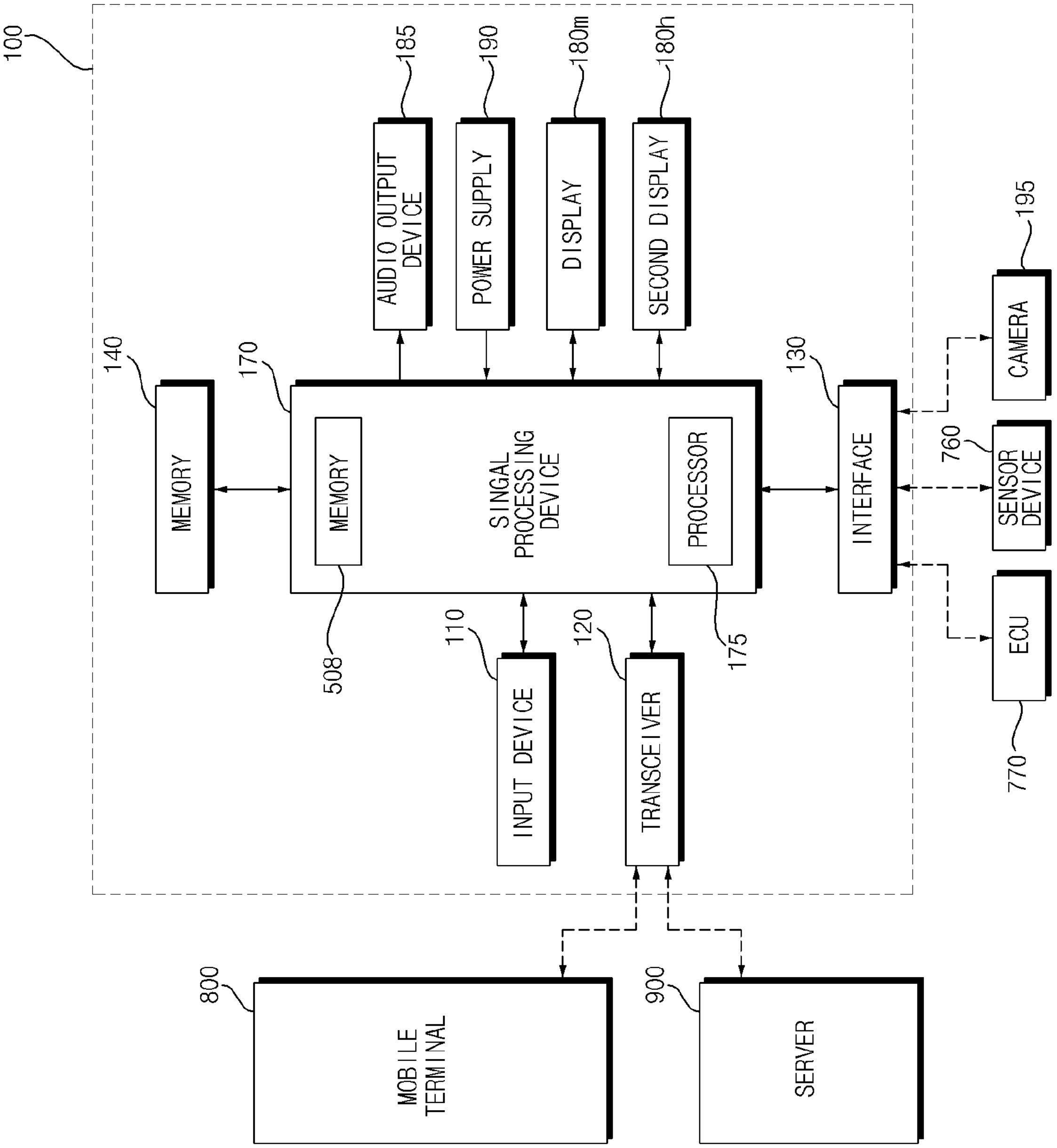
FIG. 3 illustrates an example of an internal block diagram of the display apparatus for vehicle of FIG. 2.

FIG. 3 illustrates an example of an internal block diagram of a display apparatus for vehicle according to an embodiment of the present disclosure.

Referring to FIG. 3, the vehicle display apparatus 100 according to an embodiment of the present disclosure may include an input device 110, a transceiver 120, an interface 130, a memory 140, a signal processing device 170, a plurality of displays 180*m* and 180*h*, an audio output device 185, and a power supply 190.

The input device 110 may include a physical button or pad for a button input or a touch input.

Meanwhile, the input device 110 may include a microphone (not shown) for a user voice input.

The transceiver 120 may wirelessly exchange data with a mobile terminal 800 or a server (not shown).

In particular, the transceiver 120 may wirelessly exchange data with a mobile terminal of a vehicle driver. Any of various data communication schemes, such as Bluetooth, Wi-Fi, Wi-Fi Direct, and APIX, may be used as a wireless data communication scheme.

The transceiver 120 may receive weather information and road traffic condition information, e.g., transport protocol expert group (TPEG) information, from the mobile terminal 800 or the server (not shown). To this end, the transceiver 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle heading information, vehicle position information (global positioning system (GPS) information), vehicle angle information, vehicle speed information, vehicle acceleration information, vehicle tilt information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position module, a vehicle forward/backward movement sensor, a wheel sensor, a vehicle speed sensor, a vehicle body tilt sensor, a battery sensor, a fuel sensor, a tire sensor, a steering wheel rotation sensor, an in-vehicle temperature sensor, or an in-vehicle humidity sensor. The position module may include a GPS module to receive GPS information.

Meanwhile, the interface 130 may receive front-of-vehicle image data, side-of-vehicle image data, rear-of-vehicle image data, and obstacle-around-vehicle distance information from a camera 195 or a lidar (not shown), and may transmit the received information to the signal processing device 170.

The memory 140 may store various data necessary for the overall operation of the vehicle display apparatus 100, such as programs for processing or control of the signal processing device 170.

For example, the memory 140 may store data regarding a hypervisor, a server virtual machine (not shown), and a plurality of guest virtual machines executed in the processor 175.

The audio output device 185 may convert an electrical signal from the signal processing device 170 into an audio signal so as to output the audio signal. To this end, the audio output device 185 may include a speaker, etc.

The power supply 190 may supply power required to operate components under the control of the signal processing device 170. In particular, the power supply 190 may receive power from a battery in the vehicle.

The HUD display **180*h*, which is the second display, may include a picture generation device (not shown) to project an image, and may output an augmented reality-based object under the control of the signal processing device 170**.

For example, the HUD display **180*h*** may output vehicle speed information, vehicle traveling direction information, a front vehicle object, a distance indicator showing a distance from a vehicle ahead, and the like.

As another example, the HUD display **180*h*** may output an augmented reality lane carpet, an augmented reality route carpet, or an augmented reality dynamic carpet corresponding to a road image.

The signal processing device 170 may control the plurality of displays **180*m* and 180*h***.

The signal processing device 170 may control the overall operation of each device or unit in the vehicle display apparatus 100.

For example, the signal processing device 170 may include a processor 175 configured to perform signal processing for the memory 508 and the display **180*m***.

The processor 175 may execute a hypervisor (not shown), and may execute a server virtual machine (not shown) and a plurality of guest virtual machines (not shown) on the executed hypervisor.

Here, the first guest virtual machine (not shown) may be operated for the first display **180*m*, and the second guest virtual machine (not shown) may be operated for the second display 180*h***.

Meanwhile, the signal processing device 170 may process various signals, such as an audio signal, an image signal, and a data signal. To this end, the signal processing device 170 may be implemented in the form of a system on chip (SOC).

Figure 4:
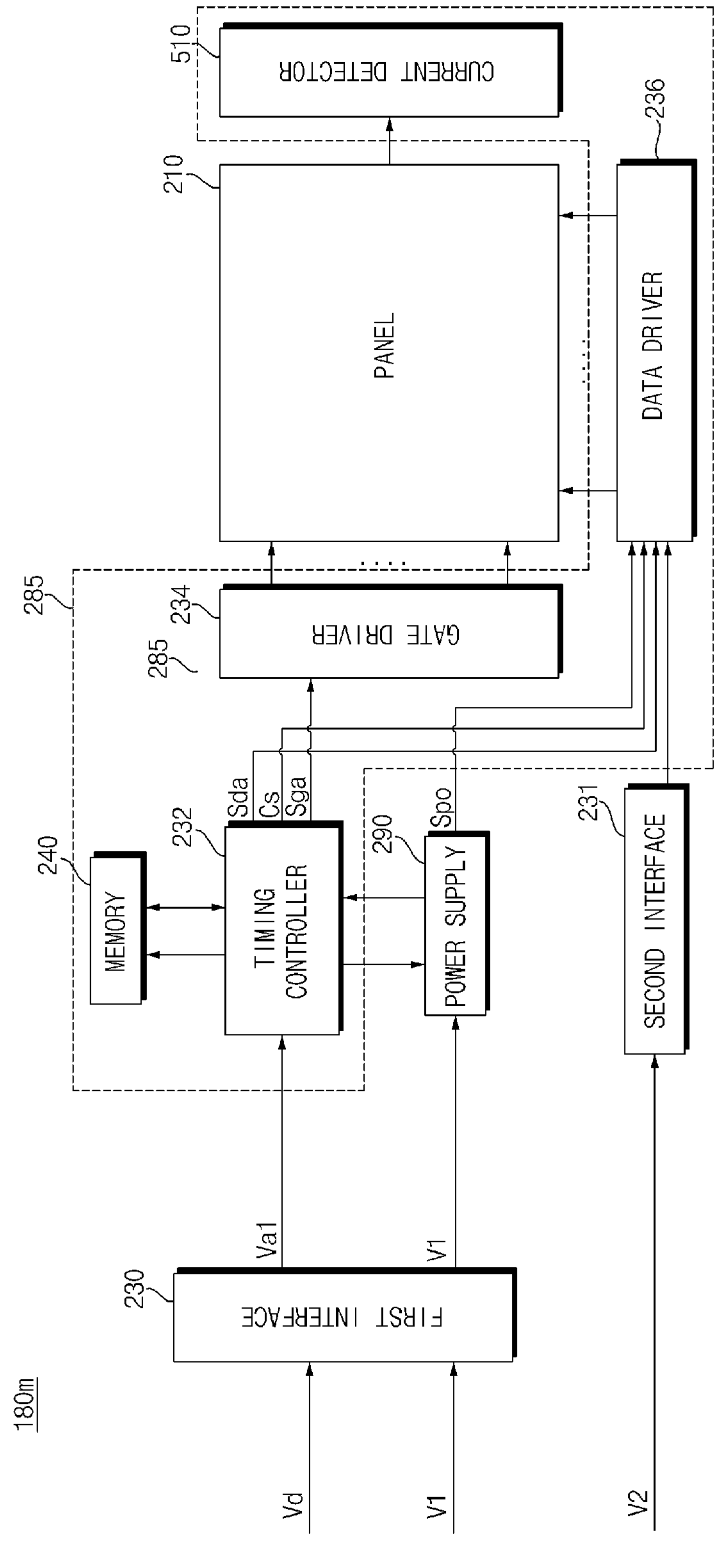
FIG. 4 is an internal block diagram of the display of FIG. 2.

FIG. 4 is an internal block diagram of a display of FIG. 2.

Hereinafter, a description will be given based on the first display **180*m***.

Referring to FIG. 4, the OLED panel-based display **180*m* may include an organic light emitting diode (OLED) panel 210, a first interface 230, a second interface 231, a timing controller 232, a gate driver 234, a data driver 236, a memory 240, a processor 270, a power supply 290, a current detector 510**, and the like.

The display **180*m* may receive an image signal Vd, a first DC power V1, and a second DC power V2**, and may display a certain image based on the image signal Vd.

Meanwhile, the first interface 230 in the display **180*m* may receive the image signal Vd and the first DC power V1 from the signal processing device 170**.

Here, the first DC power V1 may be used for the operation of the power supply 290 and the timing controller 232 in the display **180*m***.

Next, the second interface 231 may receive a second DC power V2 from an external power supply 190. Meanwhile, the second DC power V2 may be input to the data driver 236 in the display **180*m***.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processing device 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

In this case, when the panel 210 includes a RGB subpixel, the data driving signal Sda may be a data driving signal for driving of RGB subpixel.

Meanwhile, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and a data signal to the OLED panel 210 through a gate line GL and a data line DL, respectively, according to the gate driving signal Sga and the data driving signal Sda from the timing controller 232. Accordingly, the OLED panel 210 displays a certain image.

Meanwhile, the OLED panel 210 may include an organic light emitting layer. In order to display an image, a plurality of gate lines GL and data lines DL may be disposed in a matrix form in each pixel corresponding to the organic light emitting layer.

Meanwhile, since a scan signal is input to the gate line GL, the gate line may also be referred to as a scan line.

Meanwhile, the data driver 236 may output a data signal to the OLED panel 210 based on a second DC power V2 from the second interface 231.

The power supply 290 may supply various power supplies to the gate driver 234, the data driver 236, the timing controller 232, and the like.

The current detector 510 may detect the current flowing in a subpixel of the OLED panel 210. The detected current may be input to the processor 270 or the like, for a cumulative current calculation.

Meanwhile, the timing controller 232, the gate driver 234, the data driver 236, and the memory 240 in the drawing may be configured as a single integrated circuit (IC).

Therefore, the timing controller 232, the gate driver 234, the data driver 236, and the memory 240 may be referred to as a driving controller 285.

Meanwhile, the driving controller 285 may include a buffer (not shown) to store frame data.

In particular, the timing controller 232 in the driving controller 285 may output a gate driving signal and a data driving signal based on the frame data stored in the buffer (not shown) or the memory 240.

The timing controller 232 or the driving controller 285 may perform various types of control in the display 180*m*. For example, the timing controller 232 or the driving controller 285 may control the gate driver 234, the data driver 236, the timing controller 232, etc.

Meanwhile, the timing controller 232 or the driving controller 285 may receive information of the current flowing in a subpixel of the panel 210 from the current detector 510.

Then, based on the current information flowing in the subpixel of the panel 210, the timing controller 232 or the driving controller 285 may calculate the accumulated current of each subpixel of the panel 210. The calculated accumulated current may be stored in the memory 240.

Meanwhile, when the accumulated current of each subpixel of the panel 210 is greater than or equal to an allowable value, the timing controller 232 or the driving controller 285 may determine that it is burn-in.

For example, when the accumulated current of each subpixel of the panel 210 is greater than or equal to 300000 A, the timing controller 232 or the driving controller 285 may determine that a corresponding subpixel is a burn-in subpixel.

Meanwhile, when the accumulated current of a subpixel, among the subpixels of the panel 210, is close to an allowable value, the timing controller 232 or the driving controller 285 may determine that the corresponding subpixel is a subpixel likely to cause burn-in.

Meanwhile, based on the current detected by the current detector 510, the timing controller 232 or the driving controller 285 may determine that a subpixel having the greatest accumulated current is a burn-in expected (or potential) subpixel.

Meanwhile, regardless of the operation of the current detector 510, the timing controller 232 or the driving controller 285 may estimate information of the current to flow in the subpixel based on an image signal from the signal processing device 170, and may determine, based on the estimated current information, a subpixel likely to cause burn-in.

FIGS. 5A to 5D are reference diagrams for explaining an organic light emitting diode (OLED) panel of FIG. 4.

Figure 5A:
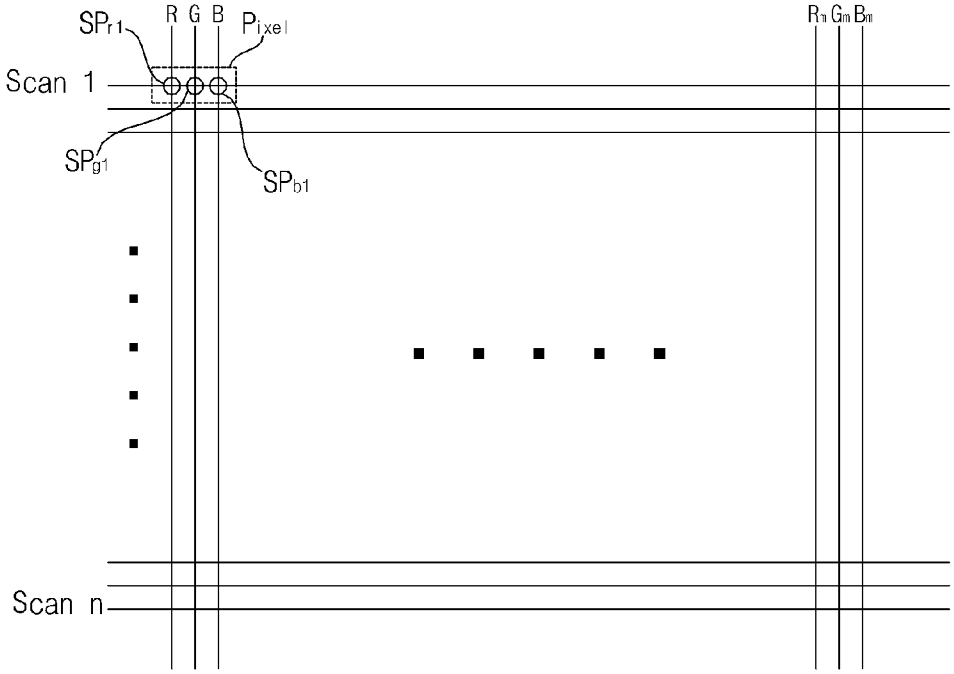
FIG. 5A to FIG. 5D are reference diagrams for explaining an organic light emitting diode (OLED) panel of FIG. 4.

FIG. 5A illustrates an example of a pixel in the OLED panel 210.

Referring to FIG. 5A, the OLED panel 210 may include a plurality of scan lines Scan 1 to Scan n and a plurality of data lines R1, G1, B1 to Rm, Gm, Bm intersecting the scan lines.

Meanwhile, a pixel (subpixel) is defined in an intersecting area of the scan line and the data line in the OLED panel 210. In the drawing, a pixel including subpixels SR1, SG1 and SB1 of RGB is shown.

The subpixels SR1, SG1 and SB1 of RGB are respectively provided with a red organic light emitting diode, a green organic light emitting diode, and a blue organic light emitting diode.

Figure 5B:
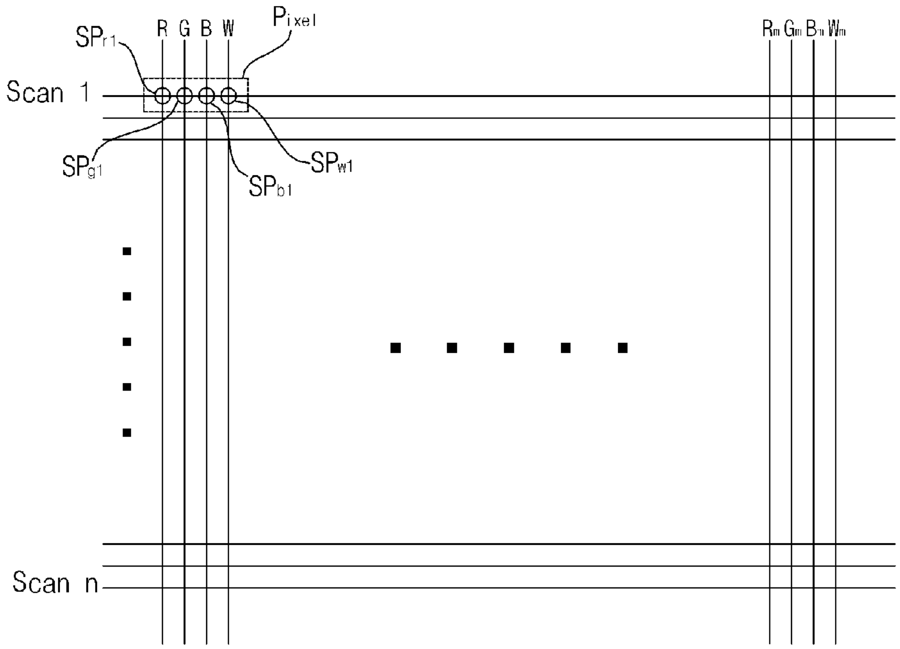

FIG. 5B illustrates another example of a pixel in the OLED panel 210.

Referring to FIG. 5B, the OLED panel 210 may include a plurality of scan lines Scan 1 to Scan n and a plurality of data lines R1, G1, B1, W1 to Rm, Gm, Bm, Wm intersecting the scan lines.

Meanwhile, a pixel (subpixel) is defined in an intersecting area of the scan line and the data line in the OLED panel 210. In the drawing, a pixel including subpixels SR1, SG1, SB1 and SW1 of RGBW is shown.

The subpixels SR1, SG1, SB1 and SW1 of RGBW are respectively provided with a red organic light emitting diode, a green organic light emitting diode, a blue organic light emitting diode, and a white organic light emitting diode.

Figure 5C:
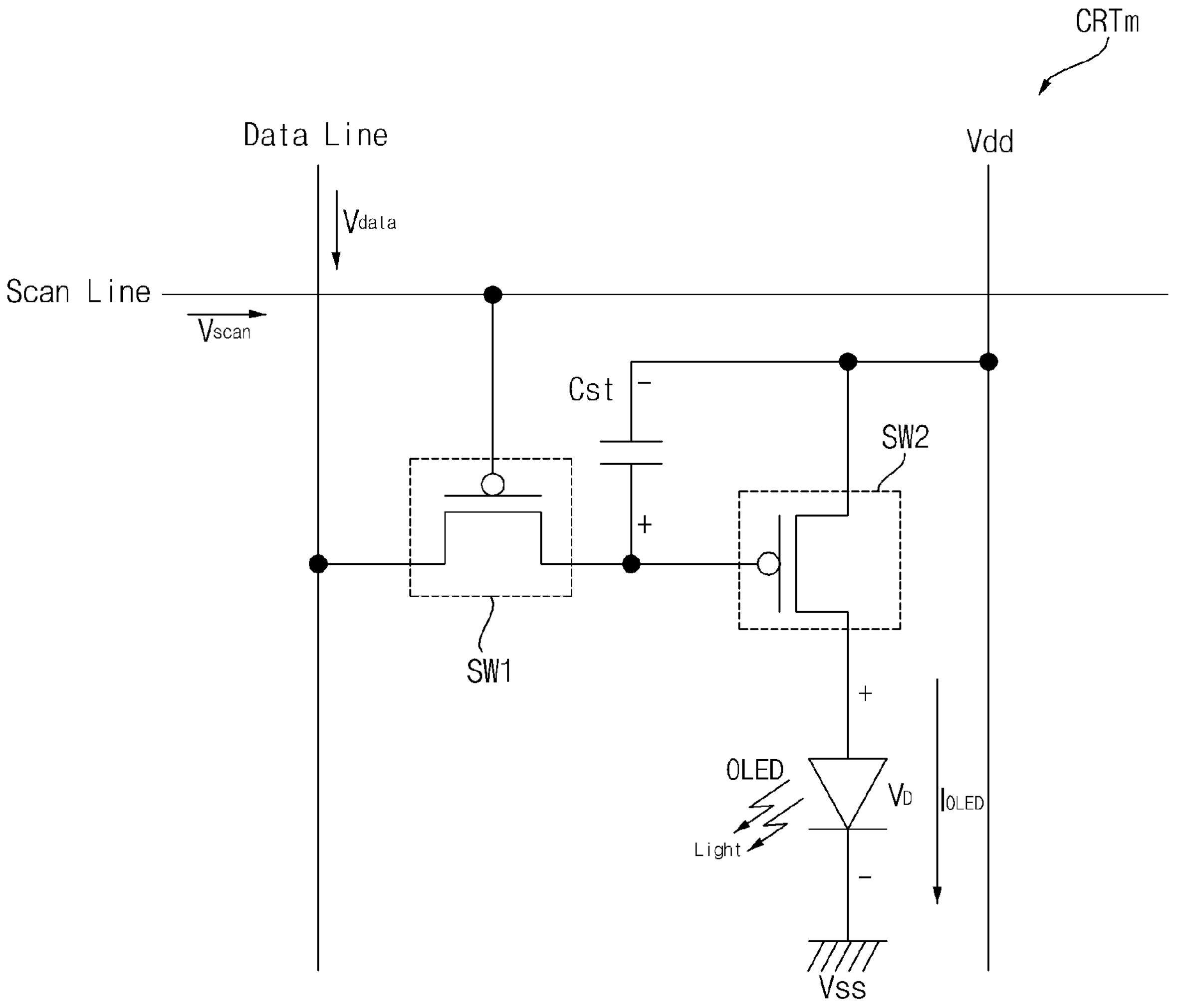

FIG. 5C illustrates an example of a circuit of a subpixel in the pixel of the OLED panel of FIG. 5A or FIG. 5B.

Referring to FIG. 5C, a subpixel circuit CRTm, which is an active type, may include a scan switching element SW1, a storage capacitor Cst, a drive switching element SW2, and an organic light emitting layer OLED.

The scan switching element SW1 is turned on in response to an input scan signal Vdscan, as a scan line is connected to a gate terminal. When it is turned on, an input data signal Vdata is transferred to the gate terminal of the drive switching element SW2 or one end of the storage capacitor Cst.

The storage capacitor Cst is provided between the gate terminal and the source terminal of the drive switching element SW2, and stores a predetermined difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

As another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, a driving current (IOLED), which is proportional to the stored power level, flows in the organic light emitting layer OLED. Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, in the drawing, it is illustrated that a p-type MOSFET is used for the scan switching element SW1 and the drive switching element SW2, but an n-type MOSFET or any of other switching elements, such as a JFET, IGBT, SIC, or the like, is also available.

Meanwhile, the pixel is a hold-type element that continuously emits light in the organic light emitting layer OLED, after a scan signal is applied, during a unit display period, specifically, during a unit frame.

Meanwhile, the subpixel circuit CRTm in the drawing is driven by an active-matrix scheme.

Figure 5D:
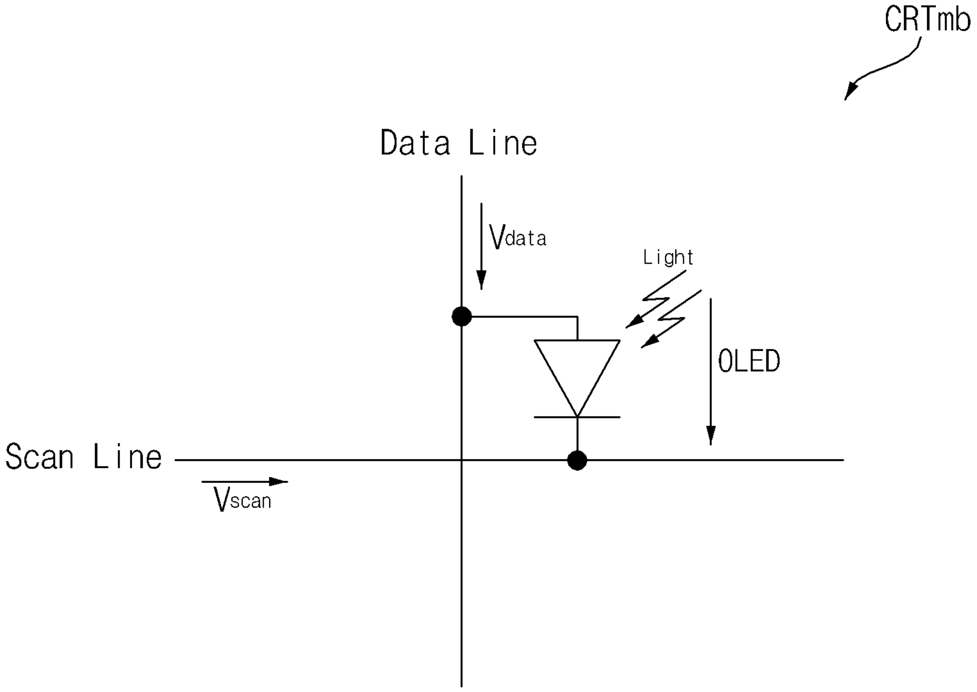

FIG. 5D illustrates another example of a circuit of a subpixel in the pixel of the OLED panel of FIG. 5A or FIG. 5B.

Referring to FIG. 5D, an organic light emitting subpixel circuit CRTm, which is a passive type, may only include an organic light emitting diode (OLED) OLED, without a separate switching element.

As shown in the drawing, an anode of the organic light emitting diode OLED may be connected to a data line to receive a data signal Vdata, and a cathode of the organic light emitting diode OLED may be connected to a scan line to receive a scan signal Vscan.

Meanwhile, the organic light emitting diode may emit light in an organic way or in an inorganic way using a plurality of subframes based on a passive-matrix scheme.

Meanwhile, unlike the drawing, the anode of the organic light emitting diode OLED may be connected to the scan line to receive a scan signal Vscan, and the cathode of the organic light emitting diode OLED may be connected to the data line to receive a data signal Vdata.

Meanwhile, the subpixel circuit CRTm may be driven by a passive-matrix scheme.

Figure 6:
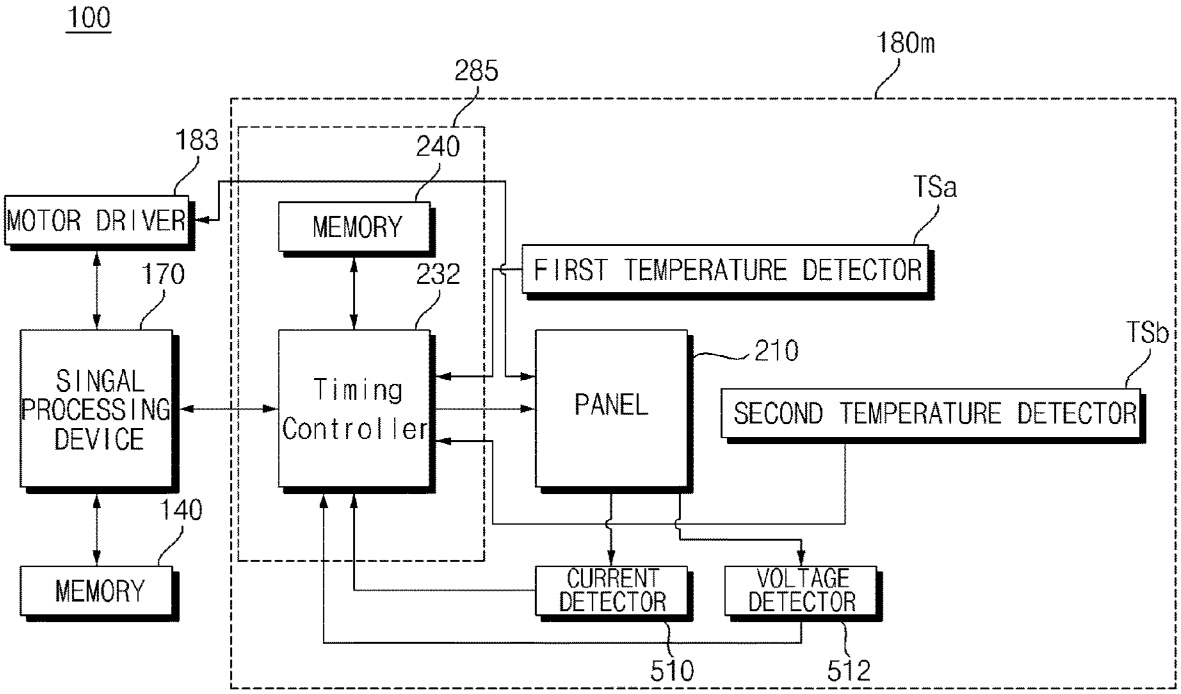
FIG. 6 illustrates an example of an internal block diagram of a display apparatus for vehicle according to an embodiment of the present disclosure.

FIG. 6 illustrates an example of an internal block diagram of a display apparatus for vehicle according to an embodiment of the present disclosure.

Referring to FIG. 6, the vehicle display apparatus 100 according to this embodiment includes a display 180M, a signal processing device 170, a memory 240, and a motor driver 183.

The motor driver 183 may be configured to adjust a height of an organic light emitting diode (OLED) panel 210.

For example, when the OLED panel 210 is in a pop-up mode, the motor driver 183 may control the height of the OLED panel 210 to be a first height hb.

As another example, when the OLED panel 210 is in a pop-down mode, the motor driver 183 may control the height of the OLED panel 210 to be a second height ha less than the first height hb.

Meanwhile, the display 180*m* in the vehicle display device 100 according to this embodiment includes the organic light emitting diode 210 and a driving controller 285 configured to output a driving signal to the OLED panel 210.

The display 180*m* in the vehicle display device 100 according to this embodiment further includes a first temperature detector TSa disposed in a first area Ara of a rear surface of the OLED panel 210 and a second temperature detector TSb disposed in a second area Arb of the rear surface of the OLED panel 210.

The display 180*m* in the vehicle display device 100 according to this embodiment further includes a current detector 510 configured to detect a current flowing through the OLED panel 210 and a voltage detector 512 configured to detect an OLED voltage of the OLED panel 210.

The driving controller 285 may further include a timing controller 232 configured to output a driving signal to the memory 240 and the OLED panel 210.

The driving controller 285 may transmit first temperature information from the first temperature detector TSa and second temperature information from the second temperature detector TSb to the signal processing device 170.

The driving controller 285 may transmit current information detected by the current detector 510 and voltage information detected by the voltage detector 512 to the signal processing device 170.

Meanwhile, the signal processing device 170 or the driving controller 285 performs a first degradation compensation mode or a second degradation compensation mode based on a difference between a first temperature detected by the first temperature detector TSa and a second temperature detected by the second temperature detector TSb.

The signal processing device 170 or the driving controller 285 controls a luminance compensation value in the second degradation compensation mode to be greater than a luminance compensation value in the first degradation compensation mode. This allows degradation to be reduced in an adaptive manner based on the temperature of each area of the panel.

Meanwhile, the signal processing device 170 or the driving controller 285 may control a luminance compensation value of the first area Ara in the second degradation compensation mode to be different from a luminance compensation value of the second area Arb in the second degradation compensation mode. This allows degradation to be reduced in an adaptive manner based on the temperature of each area of the panel.

Meanwhile, the signal processing device 170 or the driving controller 285 may perform the first degradation compensation mode in case in which a difference between a first temperature detected by the first temperature detector TSa and a second temperature detected by the second temperature detector TSb is less than or equal to a reference value, and may perform the second degradation compensation mode in case in which the difference exceeds the reference value. This allows degradation to be reduced in an adaptive manner based on the temperature of each area of the panel.

Meanwhile, the signal processing device 170 or the driving controller 285 may perform the second degradation compensation mode in case in which a difference between a first temperature and a second temperature exceeds a reference value and the second temperature is greater than the first temperature, and may control, in the second degradation compensation mode, a luminance compensation value of the second area Arb to be to be greater than a luminance compensation value of the first area Ara. This allows degradation to be reduced in an adaptive manner based on the temperature of each area of the panel.

Meanwhile, when a cumulative degradation amount of the first area Ara is greater than a cumulative degradation amount of the second area Arb, the signal processing device 170 or the driving controller 285 may perform the second degradation compensation mode in case in which a difference between a first temperature and a second temperature exceeds a reference value and the second temperature is greater than the first temperature, and may control, in the second degradation compensation mode, a luminance compensation value of the second area Arb to be greater than a luminance compensation value of the first area Ara. This allows degradation to be reduced in an adaptive manner based on the temperature of each area of the panel.

Meanwhile, the signal processing device 170 or the driving controller 285 may perform the second degradation compensation mode in case in which a difference between a first temperature and a second temperature exceeds a reference value and the first temperature is greater than the second temperature, and may control, in the second degradation compensation mode, a luminance compensation value of the first area Ara to be greater than a luminance compensation value of the second area Arb. This allows degradation to be reduced in an adaptive manner based on the temperature of each area of the panel.

Meanwhile, when performing the first degradation compensation mode, the signal processing device 170 or the driving controller 285 may control a luminance compensation value of the first area Ara to be greater than a luminance compensation value of the second area Arb in case in which a cumulative degradation amount of the first area Ara is greater than a cumulative degradation amount of the second area Arb. When performing the first degradation compensation mode, the signal processing device 170 or the driving controller 285 may control a luminance compensation value of the second area Arb to be greater than a luminance compensation value of the first area Ara in case in which a cumulative degradation amount of the second area Arb is greater than a cumulative degradation amount of the first area Ara. Accordingly, degradation may be reduced based on the first degradation compensation mode.

Meanwhile, when performing the first degradation compensation mode or the second degradation compensation mode, the signal processing device 170 or the driving controller 285 may perform a pixel shift, or a first direction line shift or a second direction line shift. This allows degradation to be reduced.

Meanwhile, when performing the first degradation compensation mode or the second degradation compensation mode, the signal processing device 170 or the driving controller 285 may perform luminance gradation processing on a third area including a boundary BL between the first area Ara and the second area Arb. Accordingly, visibility of the boundary BL area between the first area Ara and the second area Arb may be increased.

FIGS. 7A to 8C are reference diagrams for explaining the description of FIG. 6.

Figure 7A:
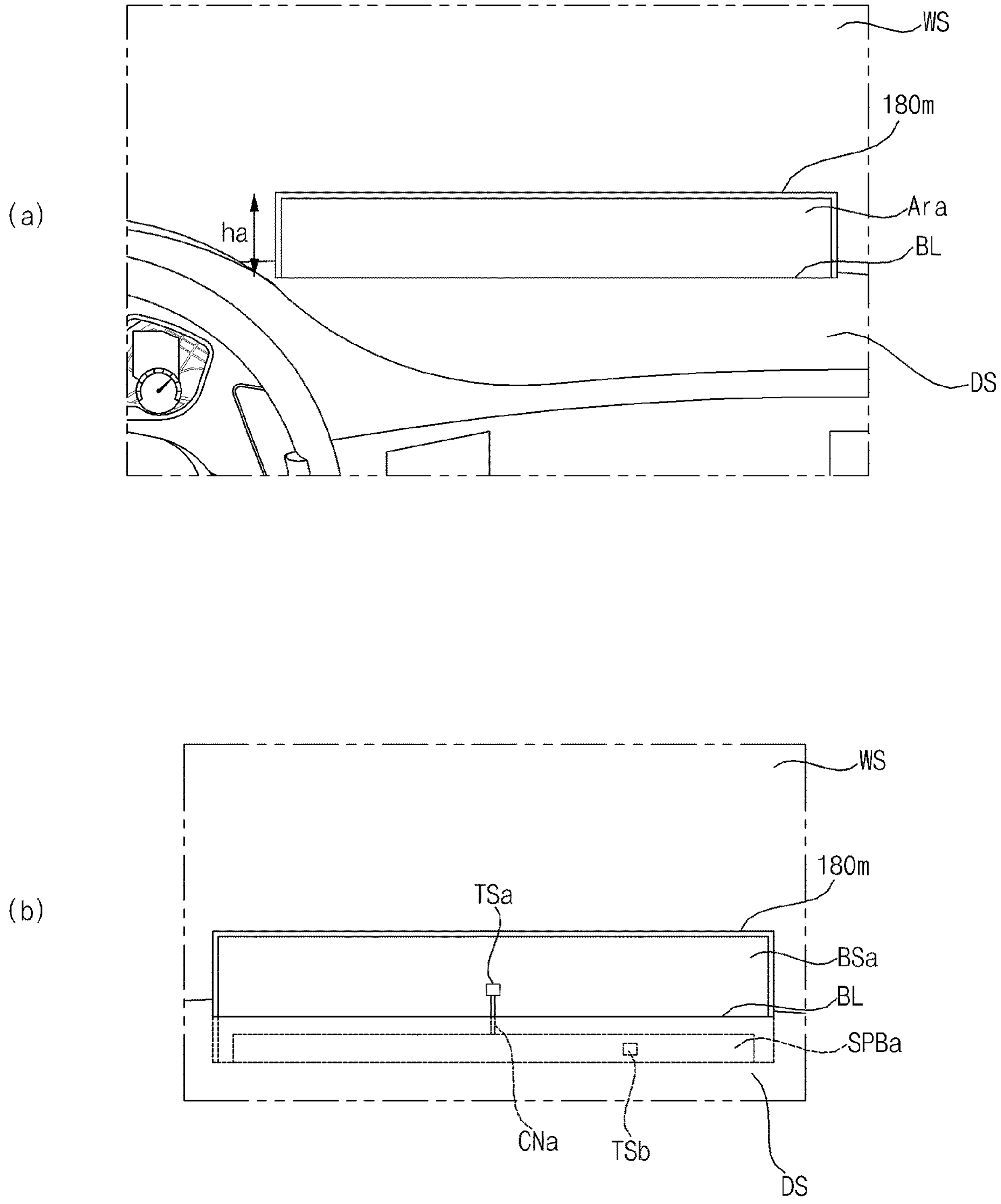
FIG. 7A to FIG. 8C are reference diagrams for explaining the description of FIG. 6.

FIG. 7A illustrates the front surface and rear surface of a display in a pop-down mode, according to an embodiment of the present disclosure.

Referring to the drawing, the display 180*m* according to an embodiment of the present disclosure may be operated in a pop-down mode in which only a first area Ara protrudes on a dashboard DS, as shown in (a) of FIG. 7A, by the operation of the motor driver 183.

The display 180*m* may have a height ha in the pop-down mode.

In this case, a boundary BL between the first area Ara and a second area Arb may be located at the height of the dashboard DS.

Meanwhile, as shown in (b) of FIG. 7A, a first temperature detector TSa and a second temperature detector TSa may be disposed at the rear surface of the display 180*m* or the rear surface of the OLED panel 210.

The first temperature detector TSa may be disposed at the first area Ara of the rear surface of the display 180*m* or the rear surface of the OLED panel 210, and the second temperature detector TSb may be disposed at the second area Arb of the rear surface of the display 180*m* or the rear surface of the OLED panel 210.

Meanwhile, a circuit board SPBa for the placement of the driving controller 285 and the like may be disposed at a lower portion of the rear surface of the display 180*m* or the rear surface of the of the OLED panel 210, and the second temperature detector TSb may be disposed on the circuit board SPBa.

Meanwhile, the first temperature detector TSa may be spaced apart from the circuit board SPBa to be disposed above the circuit board SPBa, and a conductive line CNa may be disposed between the circuit board SPBa and the first temperature detector TSa to allow the first temperature detector TSa to be connected to the circuit board SPBa.

Meanwhile, the first temperature detector TSa may be disposed in a central portion of the first area Ara, whereas the second temperature detector TSb may be disposed at a right portion of the second area Arb instead of a central portion.

Meanwhile, in the pop-down mode, the circuit board SPBa and the second temperature detector TSb may be disposed under the dashboard DS, and accordingly, the circuit board SPBa and the second temperature detector TSb may not be exposed.

In the pop-down mode, as the circuit board SPBa, the second temperature detector TSb, and the like are disposed under the dashboard DS and thus are not exposed, heat exchange may not be easily achieved compared to the first temperature detector TSa that is disposed above the dashboard DS. As a result, the temperature of the circuit board SPBa and the second temperature detector TSb, and the like may be higher than the temperature of the first temperature detector TSa.

Figure 7B:
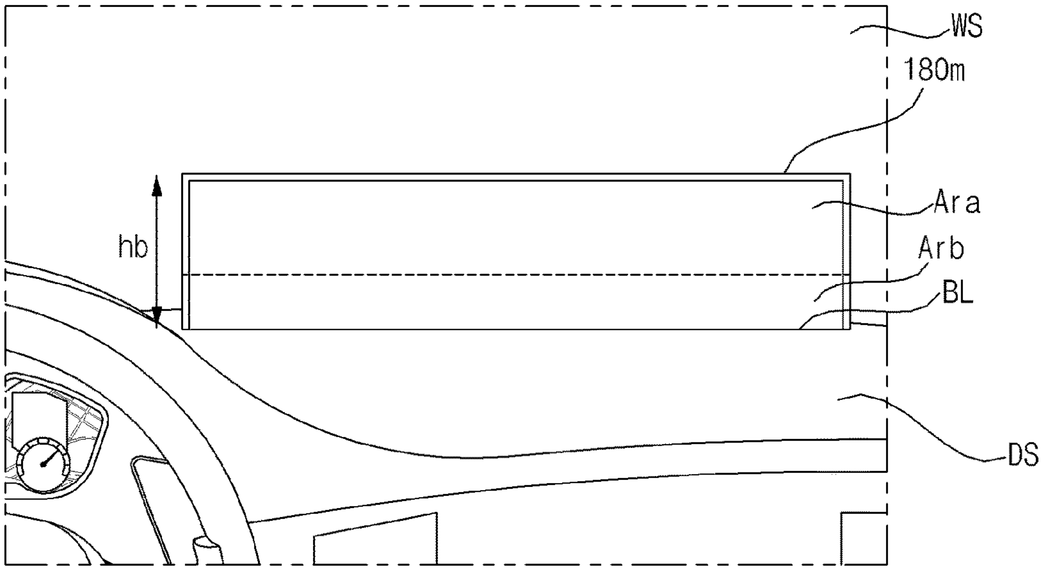
Figure 7B:
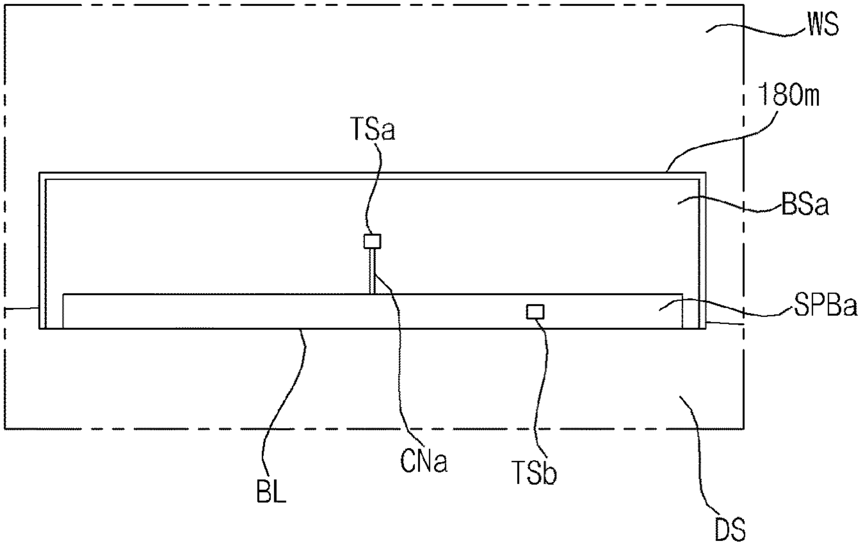

FIG. 7B illustrates the front surface and rear surface of a display in a pop-up mode, according to an embodiment of the present disclosure.

Referring to the drawing, the display 180*m* according to an embodiment of the present disclosure may be operated in a pop-up mode in which both the first area Ara and the second area Arb protrude on the dashboard DS, as shown in (a) of FIG. 7B, by the operation of the motor driver 183.

The display 180*m* may have a height hb in the pop-up mode, which is greater than the height ha of FIG. 7A.

In this case, the boundary BL between the first area Ara and the second area Arb is at a higher position than the dashboard DS, thereby being exposed.

Meanwhile, as shown in (b) of FIG. 7B, the first temperature detector TSa and the second temperature detector TSb may be disposed at the rear surface of the display 180*m* or the rear surface of the OLED panel 210.

Meanwhile, in the pop-up mode, the circuit board SPBa and the second temperature detector TSb may be at least partially exposed above the dashboard DS.

In the pop-up mode, as at least portions of the circuit board SPBa and the second temperature detector TSb are exposed, heat exchange may be more easily performed in the pop-up mode than in the pop-down mode, thereby having a lower temperature.

Figure 7C:
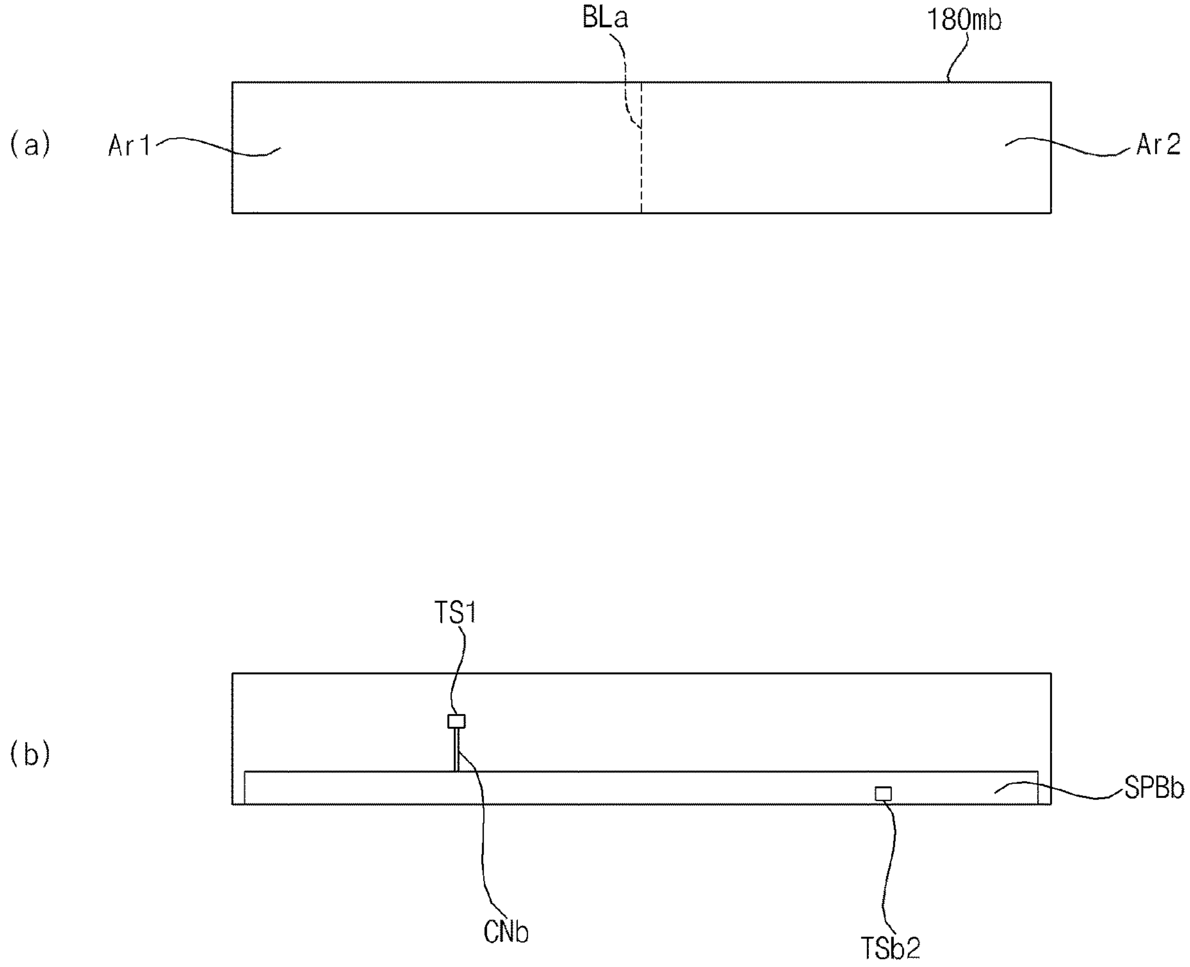

FIG. 7C illustrates the front surface and rear surface of a display according to another embodiment of the present disclosure.

Referring to the drawing, the display 180*mb* according to another embodiment of the present disclosure may include, with respect to a boundary BLa, a first area Ar1 on the left side and a second area Ar2 on the right side, as shown (a) of FIG. 7C.

Meanwhile, as shown in (b) of FIG. 7C, a first temperature detector TS1 and a second temperature detector TS2 may be disposed at the rear surface of the display 180*mb* or the rear surface of the OLED panel 210.

The first temperature detector TS1 may be disposed at the first area Ar1 of the rear surface of the display 180*mb* or the rear surface of the OLED panel 210, and the second temperature detector TS2 may be disposed at the second area Ar2 of the rear surface of the display 180*mb* or the rear surface of the OLED panel 210.

Meanwhile, a circuit board SPBb for the placement of the driving controller 285 and the like may be disposed at a lower portion of the rear surface of the display 180*mb* or the rear surface of the OLED panel 210, and the second temperature detector TS2 may be disposed on the circuit board SPBb.

Meanwhile, the first temperature detector TS1 may be spaced apart from the circuit board SPBb to be disposed above the circuit board SPBb, and a conductive line CNb may be disposed between the circuit board SPBb and the first temperature detector TS1 to allow the first temperature detector TS1 to be connected to the circuit board SPBb.

Figure 8A:
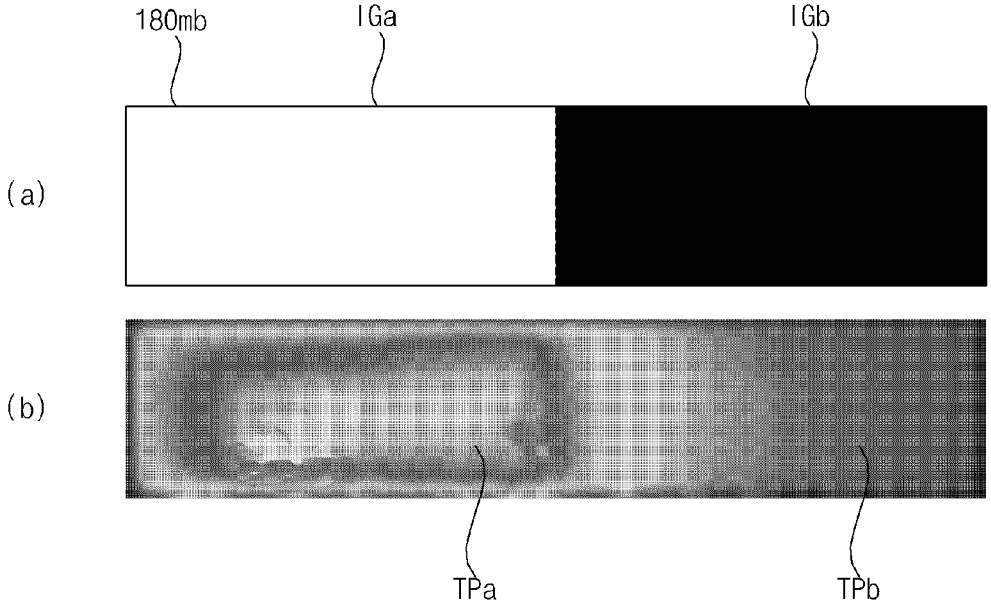

FIG. 8A illustrates an example of the temperature of each area of the display 180*mb* of FIG. 7C.

Referring to the drawing, as shown in (a) of FIG. 8A, when the first area Ar1 of the display 180*mb* is turned on (IGa) and the second area Ar2 of the display 180*mb* is turned off (IGb), a temperature distribution like (b) of FIG. 8A is detected.

Referring to (b) of FIG. 8A, it can be seen that a temperature TPa of the first area Ar1 of the display 180*mb* is significantly high, and a temperature TPb of the second area Ar2 of the display 180*mb* is low, except some portions of the left side of the second area Ar2 due to the influence of the first area Ar1.

Meanwhile, according to (b) of FIG. 8A, a temperature difference between the first area Ar1 and the second area Ar2 of the display 180*mb* may be greater than or equal to approximately 10° C.

Figure 8B:
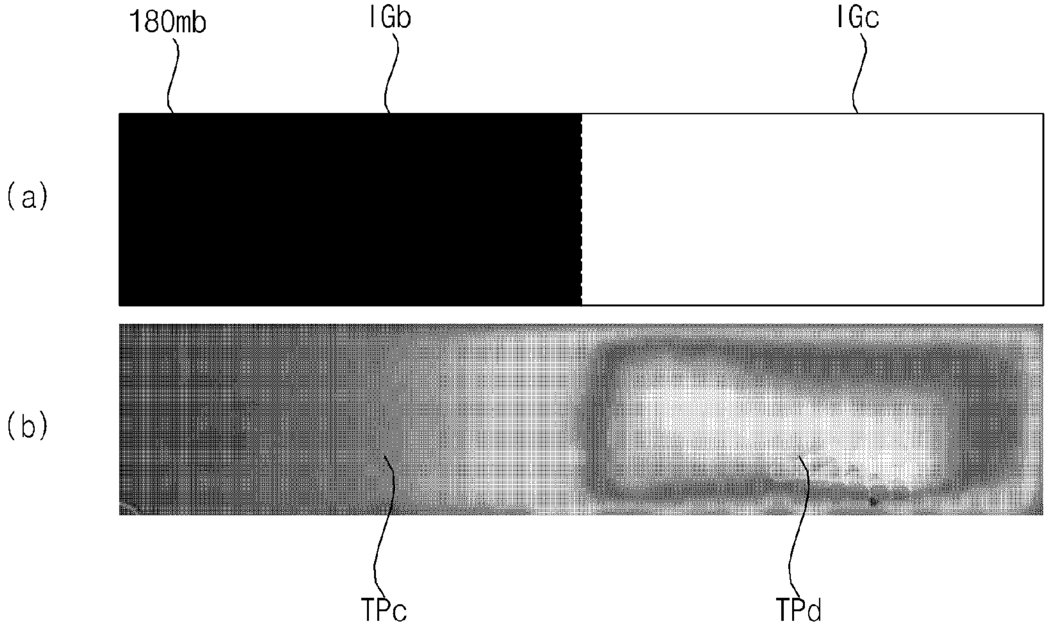

FIG. 8B illustrates another example of the temperature of each area of the display 180*mb* of FIG. 7C.

Referring to the drawing, as shown in (a) of FIG. 8B, when the first area Ar1 of the display 180*mb* is turned off (IGb), and the second area Ar2 of the display 180*mb* is turned on (IGc), a temperature distribution like (b) of FIG. 8B is detected.

Referring to (b) of FIG. 8B, it can be seen that a temperature TPd of the second area Ar2 of the display 180*mb* is significantly high, and a temperature TPc of the first area Ar1 is low, except some portions of the right side of the first area Ar1 due to the influence of the second area Ar2.

Meanwhile, according to (b) of FIG. 8B, a temperature difference between the first area Ar1 and the second area Ar2 of the display 180*mb* may be greater than or equal to approximately 10° C.

Figure 8C:
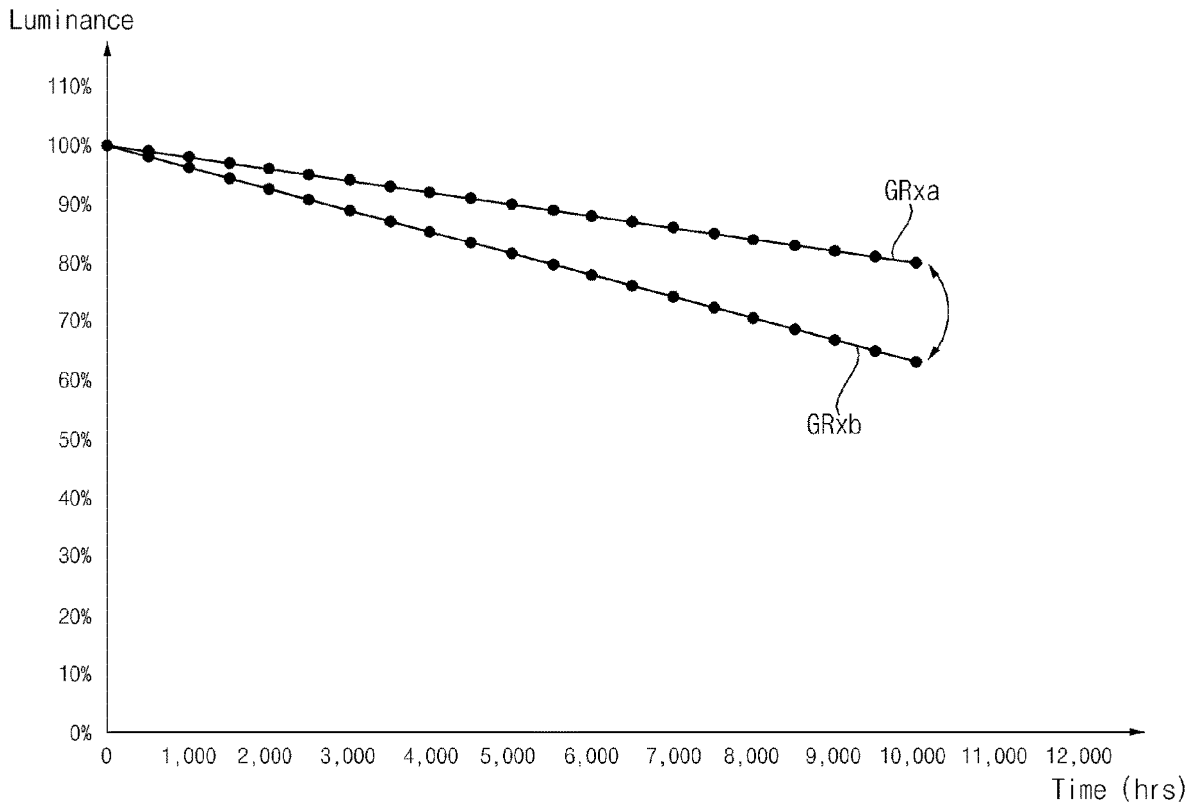

FIG. 8C illustrates an example of the life expectancy of an organic light emitting diode (OLED) panel.

Referring to FIG. 8C, a graph GRXb may correspond to the temperature TPa of the first area Ar1 of (b) of FIG. 8A or the temperature TPd of the second area Ar2 of (b) of FIG. 8B.

A graph GRXa may correspond to the temperature TPb of the second area Ar2 of (b) of FIG. 8A or the temperature TPc of the first area Ar1 of (b) of FIG. 8B.

That is, the higher the temperature, the lower the life expectancy of the OLED panel and the lower the luminance of light emission.

In particular, a difference in life expectancy between the graph GRXb and the GRXa at approximately 10000 hrs may be about 1.84 times different.

Meanwhile, a temperature difference between the areas of the display 180*m* operated in the pop-up mode and the pop-down mode, unlike FIG. 8A or FIG. 8B, is more pronounced or severe, and accordingly, a difference in life expectancy increases.

Therefore, the present disclosure provides a method of performing degradation compensation in consideration of a temperature difference between areas of the OLED panel.

In particular, as for the present disclosure, temperature detectors are provided to respective areas performing an ON mode and an OFF mode, and a first degradation compensation mode or a second degradation compensation mode is performed based on a temperature difference in the respective areas. This will be described below with reference to FIG. 9A and the following figures.

Figure 9A:
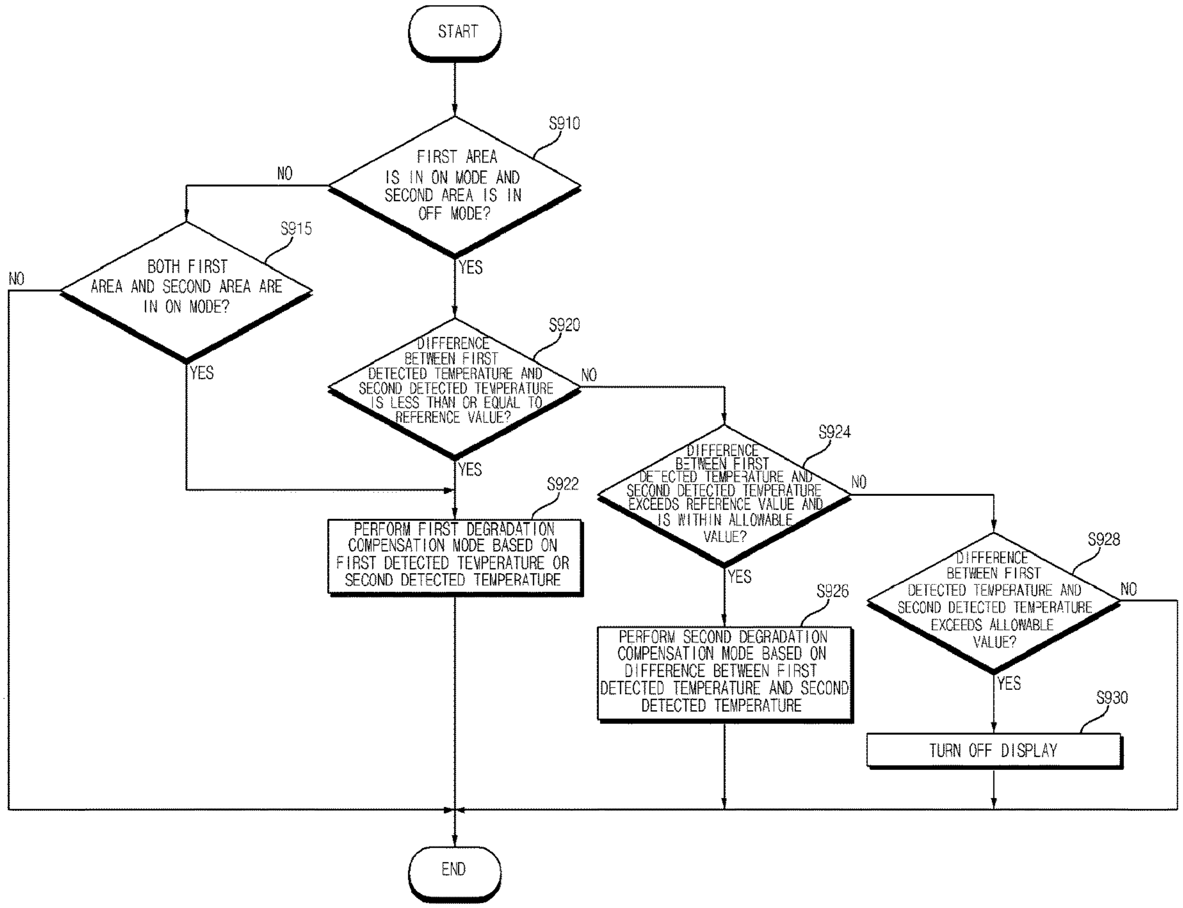
FIG. 9A is a flowchart illustrating an operation of a display apparatus for vehicle according to an embodiment of the present disclosure.

FIG. 9A is a flowchart illustrating an operation of a display apparatus for vehicle according to an embodiment of the present disclosure.

Referring to FIG. 9A, a signal processing device 170 or a driving controller 285 in the vehicle display apparatus 100 according to an embodiment of the present disclosure determines whether a first area is in an ON mode and a second area is in an OFF mode (S910).

For example, the signal processing device 170 or the driving controller 285 may determine whether the first area Ara of the display 180*m* of FIG. 7A and FIG. 7B is in the ON mode and the second area Arb of the display 180*m* of FIG. 7A and FIG. 7B is in the OFF mode.

As another example, the signal processing device 170 or the driving controller 285 may determine whether the first area Ar1 of the display 180*mb* of FIG. 8A and FIG. 8B is in the ON mode and the second area Ar2 of the display 180*mb* of FIG. 8A and FIG. 8B is in the OFF mode.

Meanwhile, at step S910, when the first area is in the ON mode and the second area is not in the OFF mode, the signal processing device 170 or the driving controller 285 may determine whether both the first area and the second area are in the ON mode (S915). When it is determined that both the first area and the second area are in the ON mode, the signal processing device 170 or the driving controller 285 may move to step S922.

That is, in case that the first area Ara is in the ON mode and the second area Arb is the ON mode, the signal processing device 170 or the driving controller 285 may perform a first degradation compensation mode.

Meanwhile, at step S910, when the first area is in the ON mode and the second area is in the OFF mode, the signal processing device 170 or the driving controller 285 may determine whether a difference between a first temperature and a second temperature is less than or equal to a reference value (S920).

When the difference between the first temperature and the second temperature is less than or equal to the reference value, the signal processing device 170 or the driving controller 285 may perform the first degradation compensation mode based on the first temperature or the second temperature (S922).

Meanwhile, when the first area Ara is in an ON mode and the second area Arb is in an OFF mode displayed at a first luminance level, the signal processing device 170 or the driving controller 285 may perform the first degradation compensation mode in case in which a first temperature detected by the first temperature detector TSa and a second temperature detected by the second temperature detector TSb is less than or equal to a reference value.

Meanwhile, in response to the first degradation compensation mode, the signal processing device 170 or the driving controller 285 may control the second area Arb to be a second luminance level less than the first luminance level.

For example, in response to the first degradation compensation mode, the signal processing device 170 or the driving controller 285 may control the luminance of the first area and the second area to be reduced.

In this case, since the difference between the first temperature and the second temperature is less than or equal to the reference value, the signal processing device 170 or the driving controller 285 may perform luminance compensation for the first area and the second area based on the cumulative degradation amount.

For example, when performing the first degradation compensation mode, the signal processing device 170 or the driving controller 285 may control a luminance compensation value of the first area Ara to be greater than a luminance compensation value of the second area Arb in case in which a cumulative degradation amount of the first area Ara is greater than a cumulative degradation amount of the second area Arb.

Meanwhile, a greater luminance compensation value may mean a greater amount of luminance reduction.

In other words, upon performing the first degradation compensation mode, the signal processing device 170 or the driving controller 285 may control, in case in which the cumulative degradation amount of the first area Ara is greater than the cumulative degradation amount of the second area Arb, a luminance value according to the luminance compensation for the first area Ara to be less than a luminance value according to the luminance compensation for the second area Arb. Accordingly, degradation may be reduced based on the first degradation compensation mode.

As another example, when performing the first degradation compensation mode, the signal processing device 170 or the driving controller 285 may control a luminance compensation value of the second area Arb to be greater than a luminance compensation value of the first area Ara in case in which a cumulative degradation amount of the second area Arb is greater than a cumulative degradation amount of the first area Ara.

In other words, upon performing the first degradation compensation mode, the signal processing device 170 or the driving controller 285 may control, in case in which the cumulative degradation amount of the second area Arb is greater than the cumulative degradation amount of the first area Ara, a luminance value according to the luminance compensation for the first area Ara to be greater than a luminance value according to the luminance compensation for the second area Arb. Accordingly, degradation may be reduced based on the first degradation compensation mode.

Meanwhile, when performing the first degradation compensation mode, the signal processing device 170 or the driving controller 285 may control a luminance compensation value to increase as the first temperature or the second temperature increases.

Meanwhile, at step S920, in case in which the difference between the first temperature and the second temperature exceeds the reference value and is within an allowable value (S924), the signal processing device 170 or the driving controller 285 may perform the second degradation compensation mode (S926).

Meanwhile, when the first area Ara is in an ON mode and the second area Arb is in an OFF mode displayed at a first luminance level, the signal processing device 170 or the driving controller 285 may perform the second degradation compensation mode in case in which a difference between a first temperature detected by the first temperature detector TSa and a second temperature detected by the second temperature detector TSb exceeds a reference value.

Meanwhile, in response to the second degradation compensation mode, the signal processing device 170 or the driving controller 285 may control the second area Arb to be a third luminance level less than the first luminance level.

Meanwhile, when the first area Ara is in an ON mode and the second area is in an OFF mode displayed at a first luminance level, the signal processing device 170 or the driving controller 285 may perform the second degradation compensation mode in case in which a first temperature detected by the first temperature detector TSa and a second temperature detected by the second temperature detector TSb exceeds a reference value and the second temperature is greater than the first temperature, and may control, in the second degradation compensation mode, a luminance compensation value of the second area Arb to be greater than a luminance compensation value of the first area Ara. This allows degradation to be reduced in an adaptive manner based on the temperature of each area of the panel.

Meanwhile, when the first area Ara is in an ON mode and the second area Arb is in an OFF mode displayed at a first luminance level, the signal processing device 170 or the driving controller 285 may perform the second degradation compensation mode in case in which a difference between the first temperature and the second temperature exceeds a reference value and the first temperature is greater than the second temperature, and may control, in the second degradation compensation mode, a luminance compensation value of the first area Ara to be greater than a luminance compensation value of the second area Arb. This allows degradation to be reduced in an adaptive manner based on the temperature of each area of the panel.

Meanwhile, at step S924, in case in which the difference between the first temperature and the second temperature is not within the allowable value, the signal processing device 170 or the driving controller 285 may determine whether the difference between the first temperature and the second temperature exceeds the allowable value (S928). In response to exceeding the allowable value, the signal processing device 170 or the driving controller 285 may control the display 180*m* or the OLED panel 210 to be turned off (S930). This provides protection for the panel.

Figure 9B:
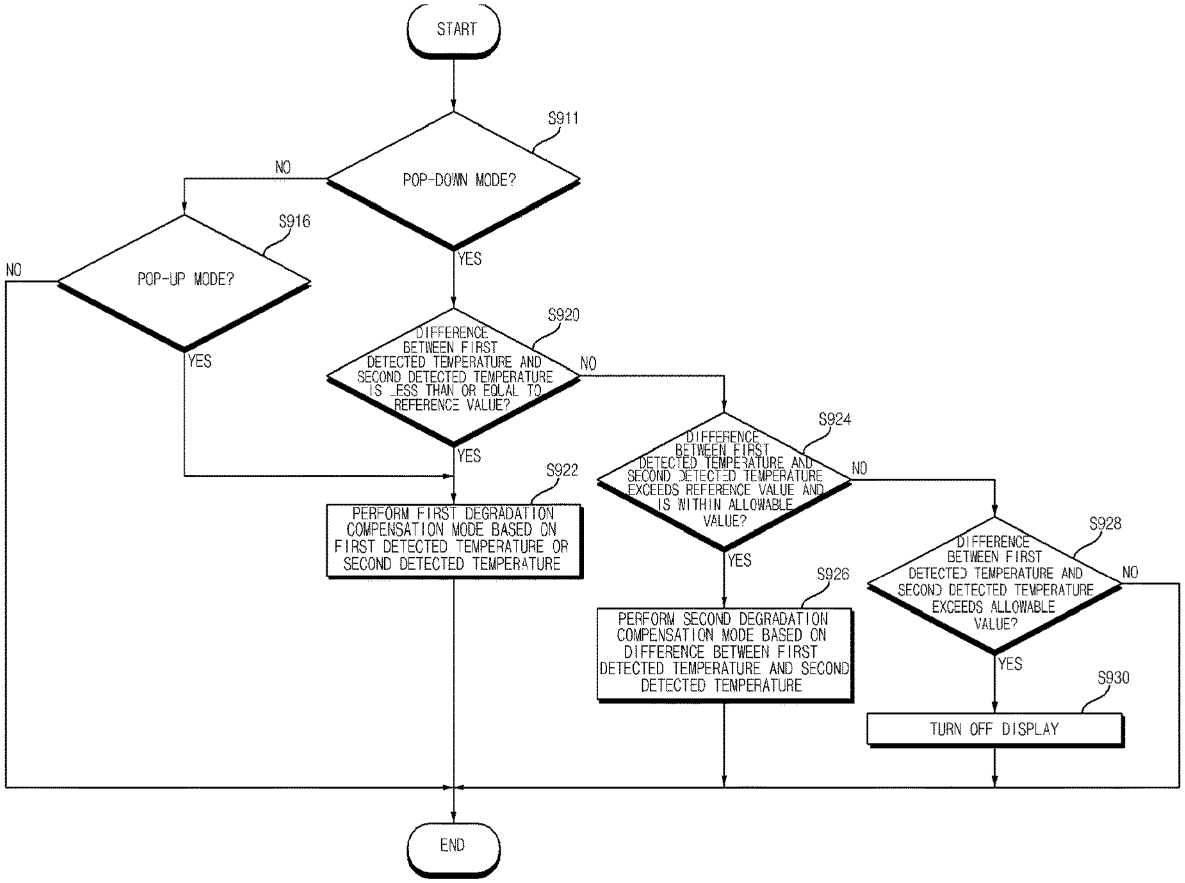
FIG. 9B is a flowchart illustrating an operation of a display apparatus for vehicle according to another embodiment of the present disclosure.

FIG. 9B is a flowchart of a display apparatus for vehicle according to another embodiment of the present disclosure.

Referring to FIG. 9B, a signal processing device 170 or a driving controller 285 in the vehicle display apparatus 100 according to another embodiment of the present disclosure determines whether a display 180*m* is in a pop-down mode (S911).

When the display 180*m* is in the pop-down mode, as shown in FIG. 7A, the display panel 180M may have the second height ha, and only the first area Ara, of the first area Ara and the second Arb, may be configured to protrude.

Meanwhile, when the display 180*m* is not in the pop-down mode, the signal processing device 170 or the driving controller 285 may determine whether the display 180*m* is in a pop-up mode (S916).

When the display 180*m* is in the pop-up mode, as shown in FIG. 7B, the display panel 180M may have the first height hb greater than the second height ha, and both the first area Ara and the second area Arb may be configured to protrude.

Meanwhile, when the display 180*m* is in the pop-up mode, the signal processing device 170 or the driving controller 285 may move to step S922.

Meanwhile, at step S911, when it is determined that the display 180*m* is in the pop-down mode, the signal processing device 170 or the driving controller 285 determines whether a difference between a first temperature and a second temperature is less than or equal to a reference value (S920).

When it is determined that the difference between the first temperature and the second temperature is less than or equal to the reference value, the signal processing device 170 or the driving controller 285 may perform a first degradation compensation mode or a second degradation compensation mode based on the first temperature or the second temperature (S922).

Meanwhile, at step S920, in case in which the difference between the first temperature and the second temperature exceeds the reference value and is within an allowable value (S924), the signal processing device 170 or the driving controller 285 may perform the second degradation compensation mode (S926).

Meanwhile, at step S924, in case in which the difference between the first temperature and the second temperature exceeds the reference value and is not within the allowable value, the signal processing device 170 or the driving controller 285 may determine whether the difference between the first temperature and the second temperature exceeds the allowable value (S928). In response to exceeding the allowable value, the signal processing device 170 or the driving controller 285 may control the display 180*m* or the OLED panel 210 to be turned off (S930). This provides protection for the panel.

Meanwhile, in the pop-down mode, the signal processing device 170 or the driving controller 285 may control the first area Ara to be operated in an ON mode and control the second area Arb to be operated in an OFF mode displayed at a first luminance level.

Here, in the pop-down mode when the first area Ara is in the ON mode and the second area Arb is in the OFF mode displayed at the first luminance level, the signal processing device 170 or the driving controller 285 may perform the first degradation compensation mode in case in which a difference between the first temperature and the second temperature is less than or equal to a reference value.

By contrast, in the pop-down mode when the first area Ara is in the ON mode and the second area Arb is in the OFF mode displayed at the first luminance level, the signal processing device 170 or the driving controller 285 may perform the second degradation compensation mode in case in which a difference between the first temperature and the second temperature exceeds the reference value.

In particular, in case in which the difference between the first temperature and the second temperature exceeds the reference value and the first temperature is greater than the second temperature, the signal processing device 170 or the driving controller 285 may perform the second degradation compensation mode.

Meanwhile, in the second degradation compensation mode, unlike the first degradation compensation mode, the signal processing device 170 or the driving controller 285 may vary the magnitude (or size) of a luminance compensation value by further considering a difference between the first temperature and the second temperature.

For example, in the second degradation compensation mode, the signal processing device 170 or the driving controller 285 may control the magnitude of a luminance compensation value to increase in case in which a difference between the first temperature and the second temperature exceeds a reference value and the difference increases. Accordingly, degradation may be reduced based on a temperature difference between the areas in the second degradation compensation mode.

Meanwhile, in the second degradation compensation mode, the signal processing device 170 or the driving controller 285 may control the magnitude of a luminance compensation value to increase in case in which a difference between the first temperature and the second temperature exceeds a reference value and the first temperature or the second temperature increases. Accordingly, degradation may be reduced based on the temperature of the area in the second degradation compensation mode.

Meanwhile, in the second degradation compensation mode, the signal processing device 170 or the driving controller 285 may control the magnitude of a luminance compensation value to increase in case in which a difference between the first temperature and the second temperature exceeds a reference value and a cumulative degradation amount of the first area Ara or a cumulative degradation amount of the second area Arb increases. Accordingly, degradation may be reduced based on the cumulative degradation amount in the second degradation compensation mode.

Figure 10A:
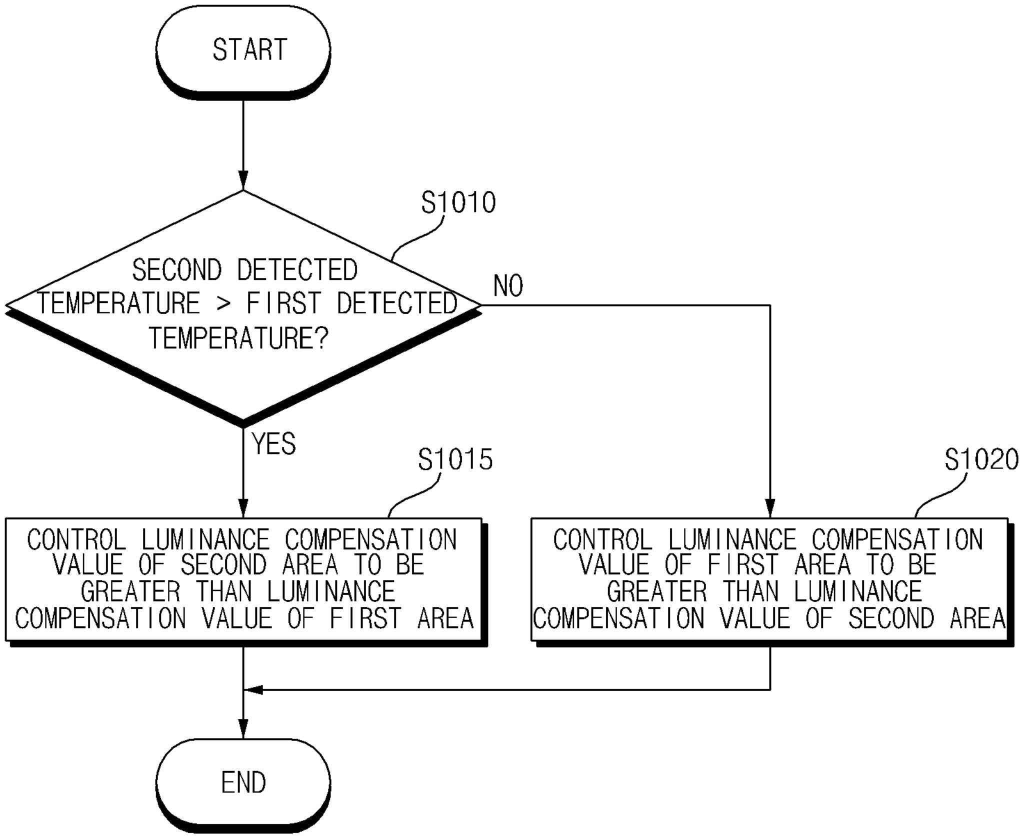
FIG. 10A to FIG. 13D are reference diagrams for explaining the description of FIG. 9A or FIG. 9B.

FIG. 10A is a flowchart illustrating the second degradation compensation mode of FIG. 9A or FIG. 9B.

Referring to FIG. 10A, when a difference between a first temperature and a second temperature exceeds a reference value, the signal processing device 170 or the driving controller 285 determines whether the second temperature is greater than the first temperature (S1010). When it is determined that the second temperature is greater than the first temperature, the signal processing device 170 or the driving controller 285 controls a luminance compensation value of the second area to be greater than a luminance value of the first area (S1015).

That is, in case in which the second temperature is greater than the first temperature while the difference between the first temperature and the second temperature exceeds the reference value, the signal processing device 170 or the driving controller 285 may control a reduced luminance level difference of the second area to be greater than a reduced luminance level difference of the first area. This allows degradation of the second area to be efficiently reduced.

Meanwhile, after step S1010, in case in which the second temperature is less than the first temperature while the difference between the first temperature and the second temperature exceeds the reference value, the signal processing device 170 or the driving controller 285 controls a luminance compensation value of the first area to be greater than a luminance compensation value of the second area (S1020).

That is, in case in which the first temperature is greater than the second temperature while the difference between the first temperature and the second temperature exceeds the reference value, the signal processing device 170 or the driving controller 285 may control a reduced luminance level difference of the first area to be greater than a reduced luminance level difference of the second area. This allows degradation of the first area to be efficiently reduced.

Figure 10B:
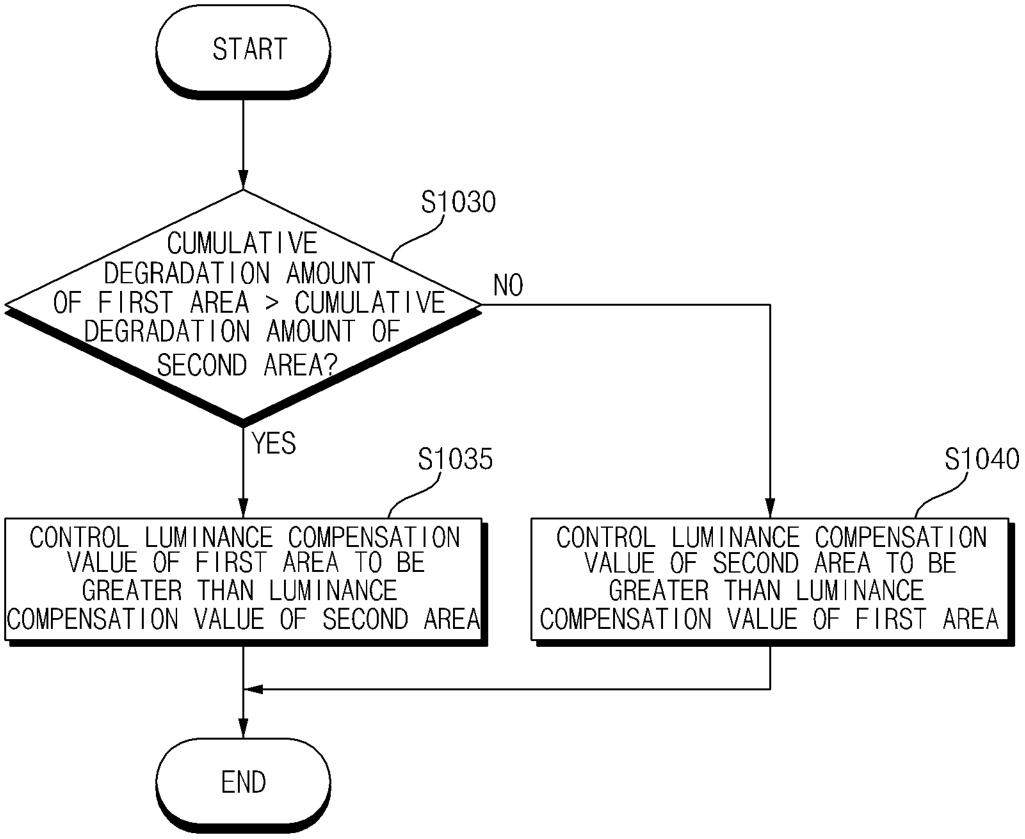

FIG. 10B is a flowchart illustrating the first degradation compensation mode of FIG. 9A or FIG. 9B.

Referring to FIG. 10B, when a difference between a first temperature and a second temperature is less than or equal to a reference value, the signal processing device 170 or the driving controller 285 determines whether a cumulative degradation amount of the first area Ara is greater than a cumulative degradation amount of the second area Arb (S1030).

When it is determined that the cumulative degradation amount of the first area Ara is greater than the cumulative degradation amount of the second area Arb, the signal processing device 170 or the driving controller 285 may control a luminance compensation value of the first area Ara to be greater than a luminance compensation value of the second area Arb.

That is, in case in which the cumulative degradation amount of the first area Ara is greater than the cumulative degradation amount of the second area Arb while the difference between the first temperature and the second temperature is less than or equal to the reference value, the signal processing device 170 or the driving controller 285 may control a reduced luminance level difference of the first area to be greater than a reduced luminance level difference of the second area. This allows degradation of the first area to be efficiently reduced.

Meanwhile, in case in which the cumulative degradation amount of the second area Arb is greater than the cumulative degradation amount of the first area Ara while the difference between the first temperature and the second temperature is less than or equal to the reference value, the signal processing device 170 or the driving controller 285 may control a luminance compensation value of the second area Arb to be greater than a luminance compensation value of the first area Ara.

That is, in case in which the cumulative degradation amount of the second area Arb is greater than the cumulative degradation amount of the first area Ara while the difference between the first temperature and the second temperature is less than or equal to the reference value, the signal processing device 170 or the driving controller 285 may control a reduced luminance level difference of the second area to be greater than a reduced luminance level difference of the first area. This allows degradation of the second area to be efficiently reduced.

Figure 11A:
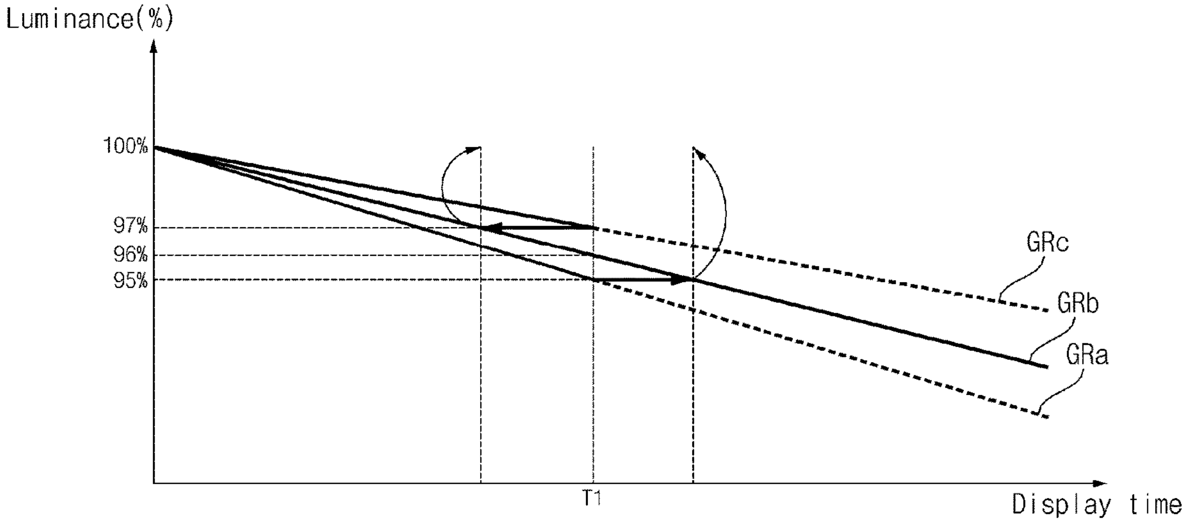

FIG. 11A illustrates different life expectancy graphs of the OLED panel.

Referring to FIG. 11A, among a plurality of life expectancy graphs GRa, GRb, and GRc, the graph Gra exhibits the highest cumulative degradation amount, and the graph GRc exhibits the lowest cumulative degradation amount.

Therefore, the graph Gra may have the greatest reduction in luminance level relative to the display time, and the graph GRc may have the lowest reduction in luminance level relative to the display time.

In the first degradation compensation mode, the signal processing device 170 or the driving controller 285 may control, among the plurality of life expectancy graphs GRa, GRb, and GRc, the graph Gra to have the greatest luminance compensation value and the graph GRc to have the lowest luminance compensation value. Accordingly, degradation compensation corresponding to the cumulative compensation amount may be performed.

Figure 11B:
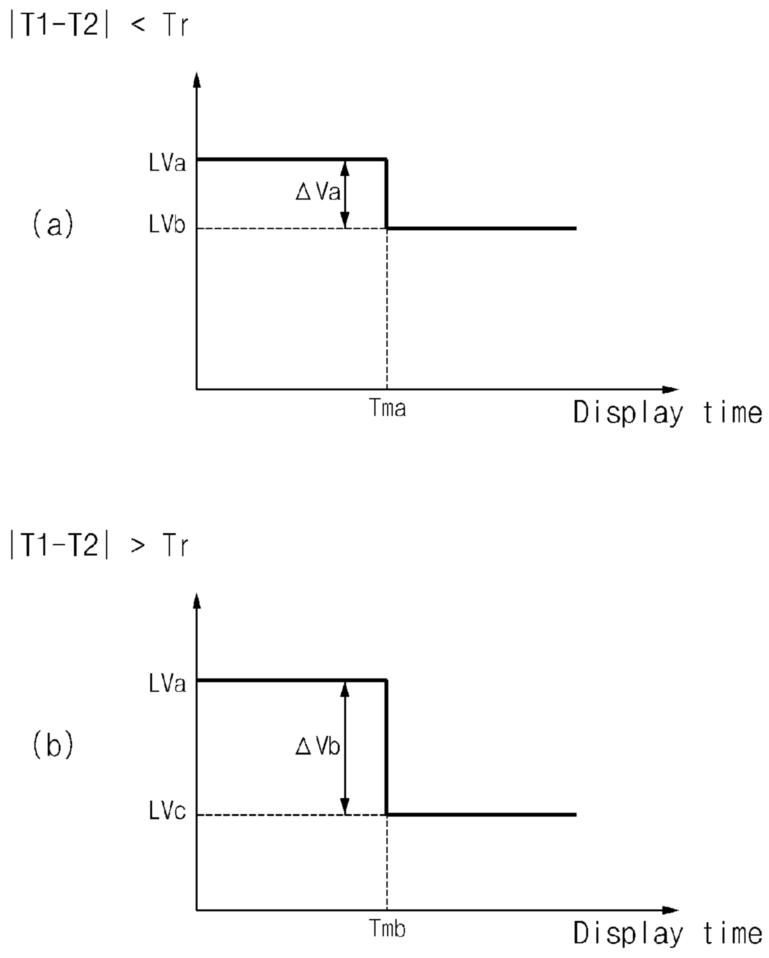

FIG. 11B illustrates examples of a first degradation compensation mode and a second degradation compensation mode.

Referring to FIG. 11B, when a difference between a first temperature and a second temperature is less than or equal to a reference value, the signal processing device 170 or the driving controller 285 may perform the first degradation compensation mode as shown in (a) of FIG. 11B.

By contrast, when a difference between a first temperature and a second temperature exceeds the reference value, the signal processing device 170 or the driving controller 285 may perform the second degradation compensation mode as shown in (b) of FIG. 11B.

In this case, the signal processing device 170 or the driving controller 285 controls a luminance compensation value in the second degradation compensation mode to be greater than a luminance compensation value in the first degradation compensation mode.

For example, when performing the first degradation compensation mode for the first area or the second area, the signal processing device 170 or the driving controller 285 may control a first luminance level LVa to be reduced to a second luminance level LVb.

That is, a difference AVa between the first luminance level LVa and the second luminance level LVb may be a luminance compensation value.

As another example, when performing the second degradation compensation mode for the first area or the second area, the signal processing device 170 or the driving controller 285 may control the first luminance level LVa to be reduced to a third luminance level LVc. Here, the third luminance level LVc may be a value less than the second luminance level LVb.

That is, a difference AVb between the first luminance level LVa and the third luminance level LVc may be a luminance compensation value, and it is preferable that the magnitude of AVb is greater than the magnitude of AVa. Accordingly, degradation compensation may be more efficiently performed in the second degradation compensation mode than in the first degradation compensation mode.

Meanwhile, the signal processing device 170 or the driving controller 285 may control a luminance compensation value of the first area Ara in the second degradation compensation mode to be different from a luminance compensation value of the second area Arb in the second degradation compensation mode.

For example, in which a difference between a first temperature and a second temperature exceeds a reference value and the second temperature is greater than the first temperature, the signal processing device 170 or the driving controller 285 may perform the second degradation compensation mode, and may control a luminance compensation value of the second area Arb in the second degradation compensation mode to be greater than a luminance compensation value of the first area Ara in the second degradation compensation mode. This will be described below with reference to FIG. 11C.

Figure 11C:
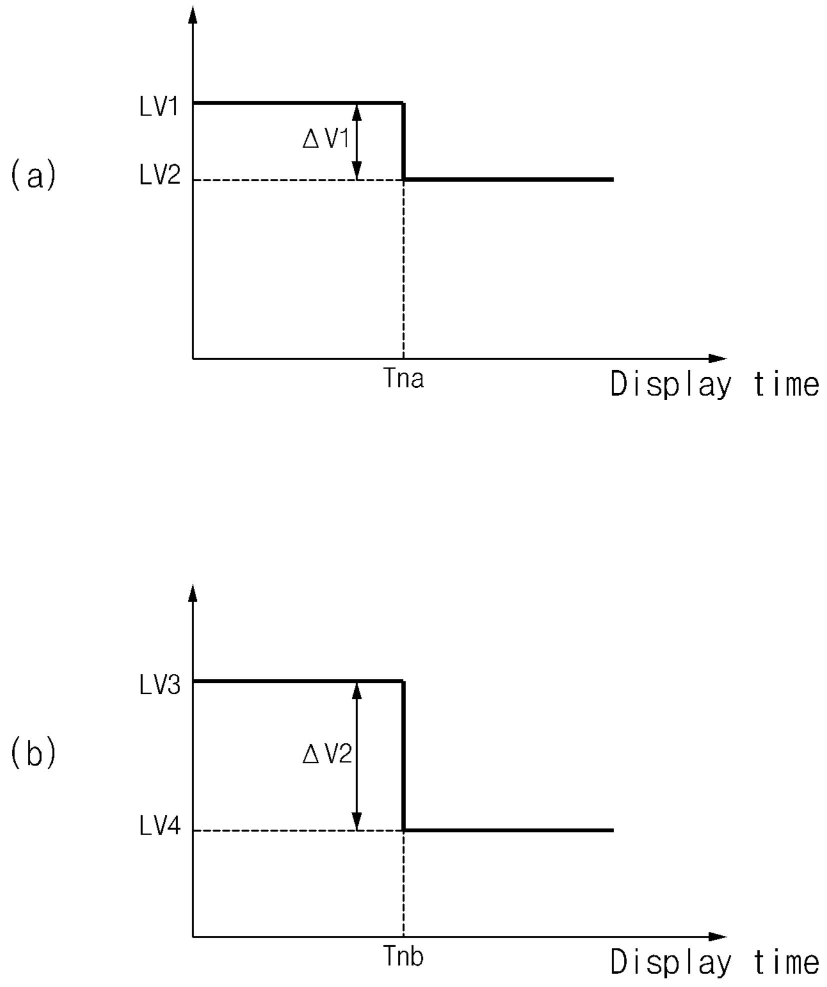

FIG. 11C illustrates examples of performing the second degradation compensation mode for a first area and a second area.

Referring to the drawing, (a) of FIG. 11C illustrates an example of performing the second degradation compensation mode for the first area when a difference between a first temperature and a second temperature exceeds a reference value and the second temperature is greater than the first temperature.

In addition, (b) of FIG. 11C illustrates an example of performing the second degradation compensation mode for the second area when a difference between a first temperature and a second temperature exceeds the reference value and the second temperature is greater than the first temperature.

For example, when a difference between a first temperature and a second temperature exceeds a reference value and the second temperature is greater than the first temperature, the signal processing device 170 or the driving controller 285 may perform the second degradation compensation mode for the first area Ara, and may control, as shown in (a) of FIG. 11C, a luminance level of the first area Ara to be reduced from a first luminance level LV1 to a second luminance level LV2.

That is, a difference AV1 between the first luminance level LV1 and the second luminance level LV2 may be a luminance compensation value.

As another example, when a difference between a first temperature and a second temperature exceeds a reference value and the second temperature is greater than the first temperature, the signal processing device 170 or the driving controller 285 may perform the second degradation compensation mode for the second area Arb, and may control, as shown in (b) of FIG. 11C, a luminance level of the second area Arb to be reduced from a third luminance level LV3 to a fourth luminance level LV4.

That is, a difference AV2 between the third luminance level LV3 and the fourth luminance level LV4 may be a luminance compensation value, and it is preferable that the magnitude of AV2 is greater than the magnitude of AV1.

Accordingly, in the second degradation compensation mode, luminance compensation for the second area may be performed more efficiently than for the first area.

Figure 12A:
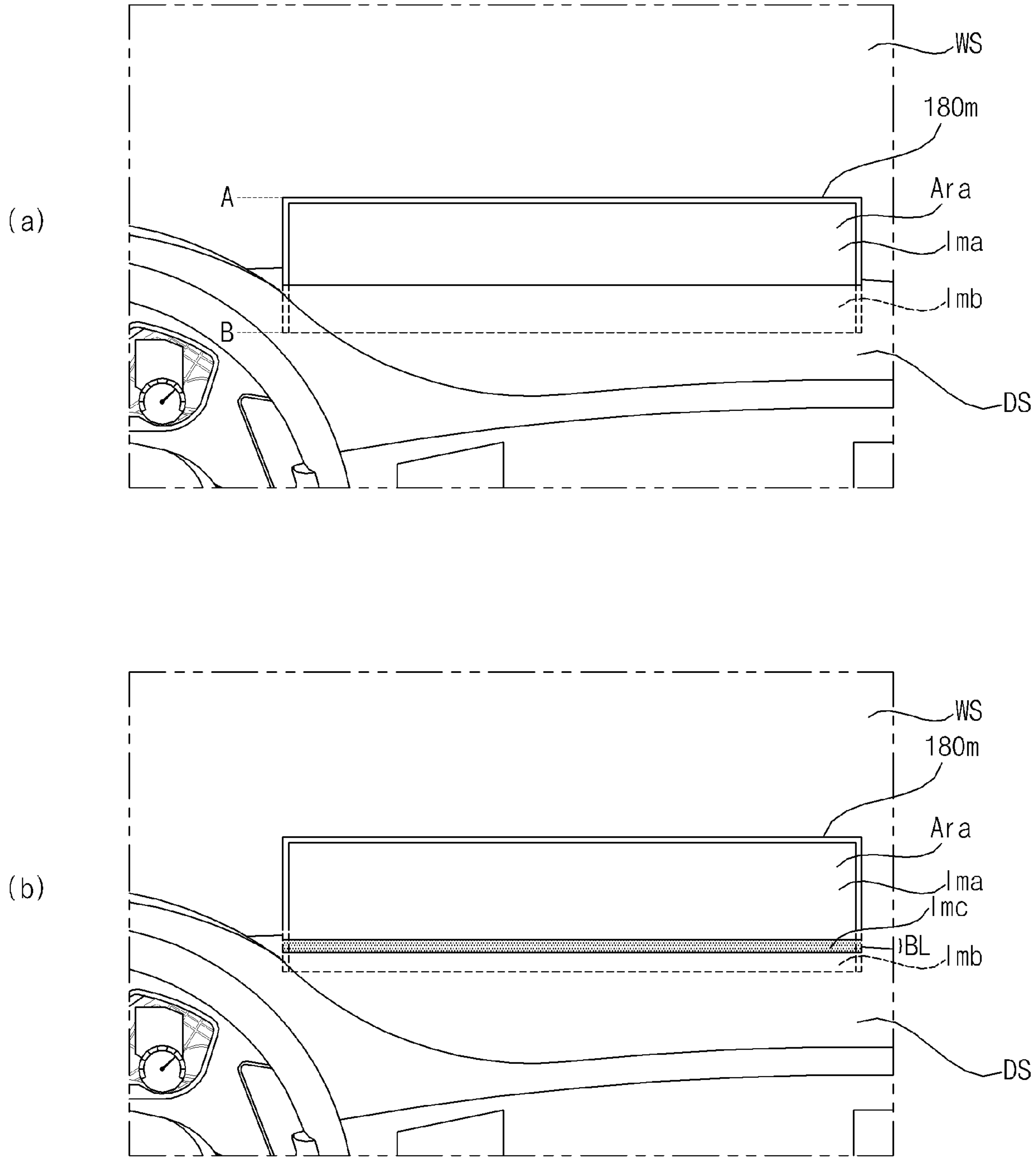

FIG. 12A illustrates an example of performing luminance gradation processing on a third area including a boundary line BL between a first area Ara and a second area Arb.

Referring to the drawing, in the pop-down mode of the display 180*m* like (a) of FIG. 12A, the signal processing device 170 or the driving controller 285 may perform no particular processing in the vicinity of the boundary BL between the first area Ara and the second area Arb.

Meanwhile, in the pop-up mode, visibility of the boundary BL area is reduced due to a luminance difference between the first area Ara and the second area Arb.

In order to address this problem, when performing the first degradation compensation mode or the second degradation compensation mode, the signal processing device 170 or the driving controller 285 according to an embodiment of the present disclosure may perform luminance gradation processing on the third area including the boundary BL between the first area Ara and the second area Arb.

That is, the signal processing device 170 or the driving controller 285 according to an embodiment of the present disclosure may display, as shown in (b) of FIG. 12A, a luminance gradation processed image Imc in the third area including the boundary BL between the first area Ara and the second area Arb.

Meanwhile, a luminance level of the luminance gradation processed image Imc may have a value between a luminance level of an image Ima of the first area Ara and a luminance level of an image Imb of the second area Arb. Due to a luminance difference between the first area Ara and the second area Arb, visibility of the boundary BL area may be increased.

Figure 12B:
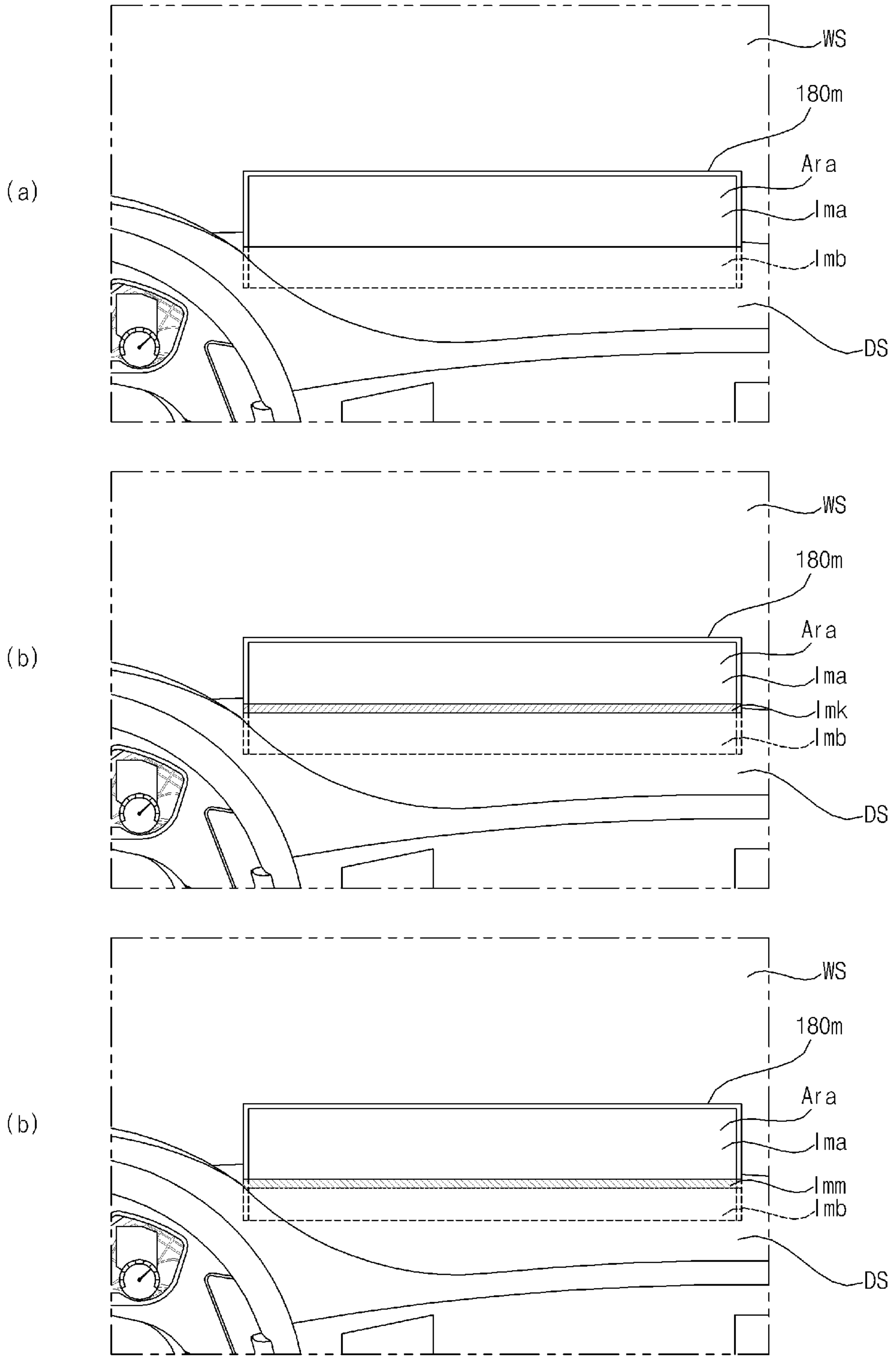

FIG. 12B illustrates various methods of increasing visibility of a boundary area of the display 180*m*.

Referring to the drawing, as shown in (a) of FIG. 12B, a first image Ima may be displayed in a first area Ara of the display 180*m*, and a second image Imb may be displayed in a second area Arb of the display 180*m*.

Meanwhile, as shown in (b) of FIG. 12B, the signal processing device 170 or the driving controller 285 may control a third image Imk having a luminance level between a luminance level of the first image Ima and a luminance level of the second image Imb to be displayed in a boundary BL between the first area Ara and the second area Arb. Accordingly, visibility of the boundary BL area between the first are Ara and the second area Arb may be increased.

Meanwhile, as shown in (c) of FIG. 12B, the signal processing device 170 or the driving controller 285 may control a fourth image Imm showing a home button or various types of information to be displayed in the boundary BL between the first area Ara and the second area Arb. Accordingly, visibility of the boundary BL area between the first area Ara and the second area Arb to be increased.

Figure 12C:
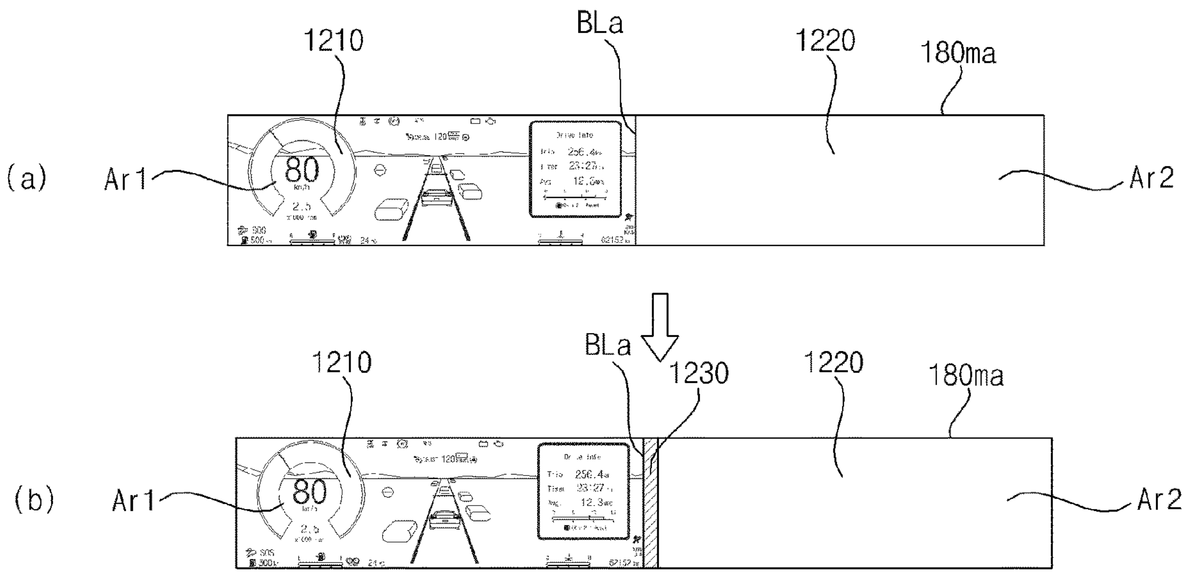
Figure 12D:
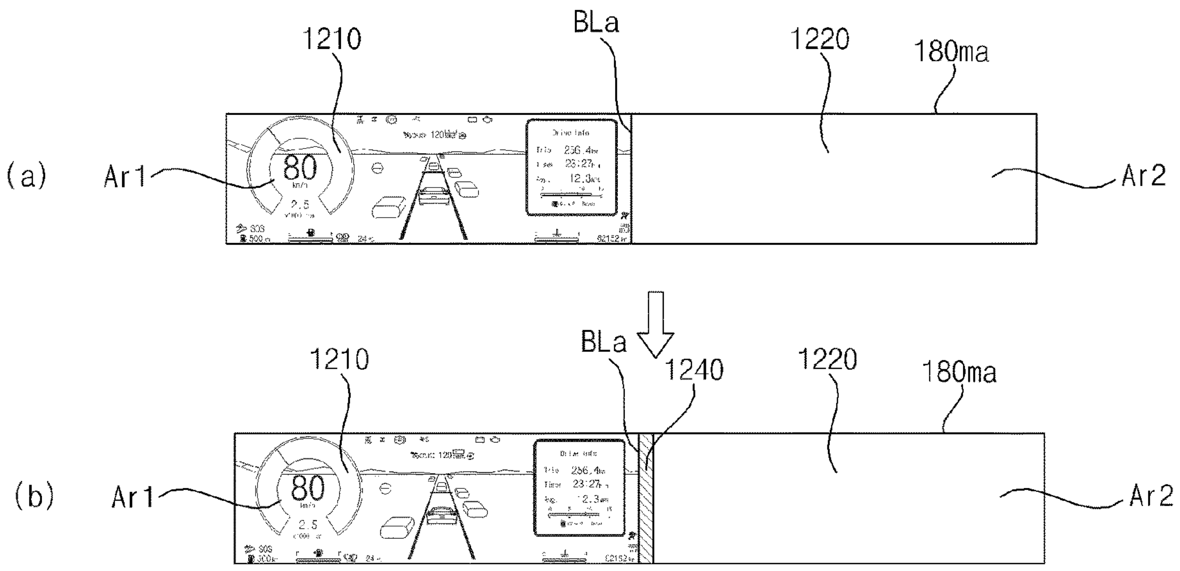

FIGS. 12C and 12D illustrate various methods of increasing visibility of the display 180*mb*.

In (a) of FIG. 12C, a first image 1210 is displayed in a first area Ar1 of the display 180*mb* and a second image 1220 is displayed in a second area Ar2 of the display 180*mb*.

Meanwhile, as shown in (b) of FIG. 12C, the signal processing device 170 or the driving controller 285 may control a third image 1230 having a luminance level between a luminance level of the first image 1210 and a luminance level of the second image 1220 to be displayed in a boundary BLa between the first area Ar1 and the second area Ar2. Accordingly, visibility of the boundary BLa area between the first Ar1 and the second area Ar2 may be increased.

In (a) of FIG. 12D, a first image 1210 is displayed in a first area Ar1 of the display 180*mb* and a second image 1220 is displayed in a second area Ar2 of the display 180*mb*.

Meanwhile, as shown in (b) of FIG. 12D, the signal processing device 170 or the driving controller 285 may control a fourth image 1240 showing a home button or various types of information to be displayed in a boundary BLa between the first area Ar1 and the second area Ar2. Accordingly, visibility of the boundary BLa area between the first area Ar1 and the second area Ar2 may be increased.

Figure 13A:
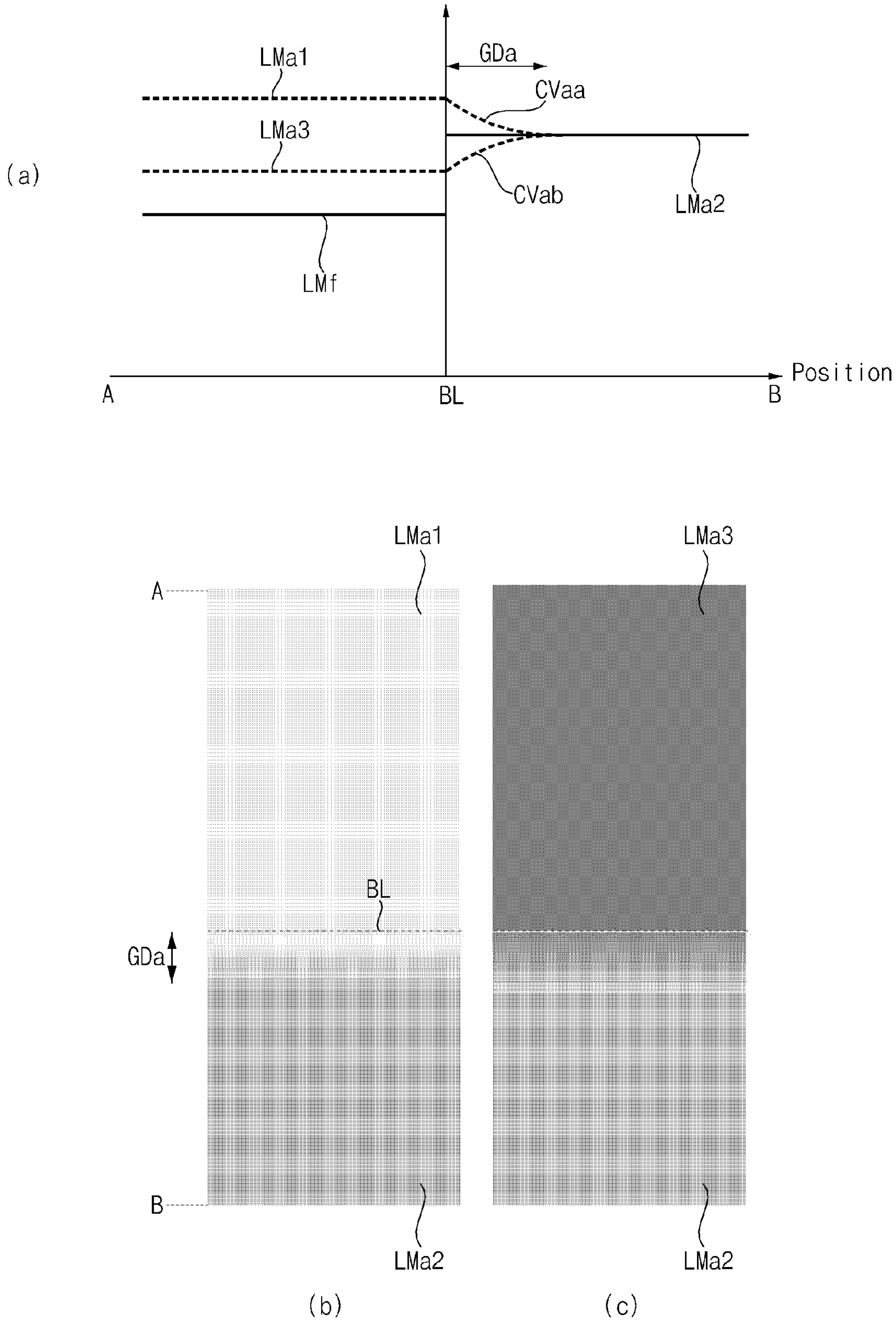
Figure 13B:
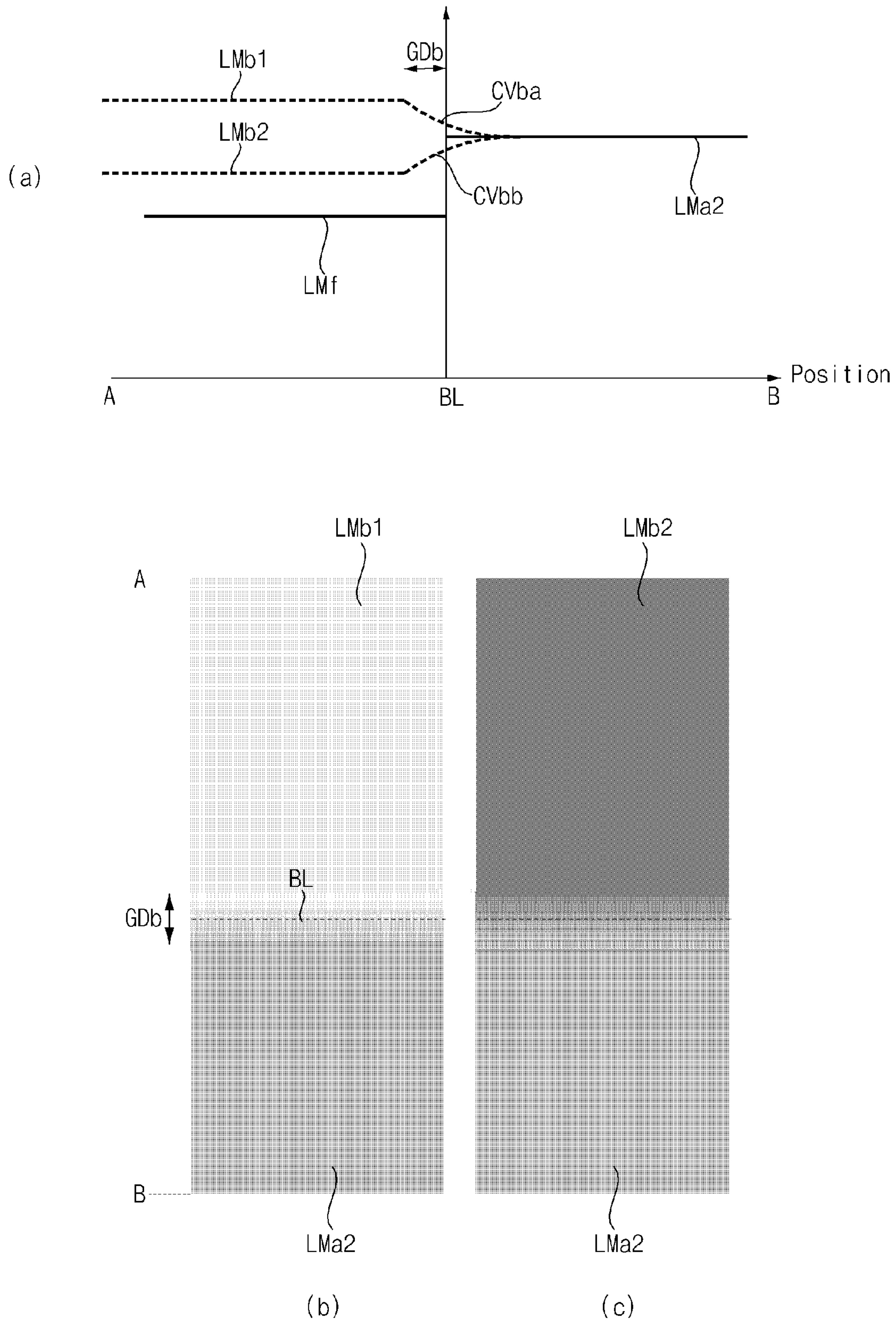
Figure 13C:
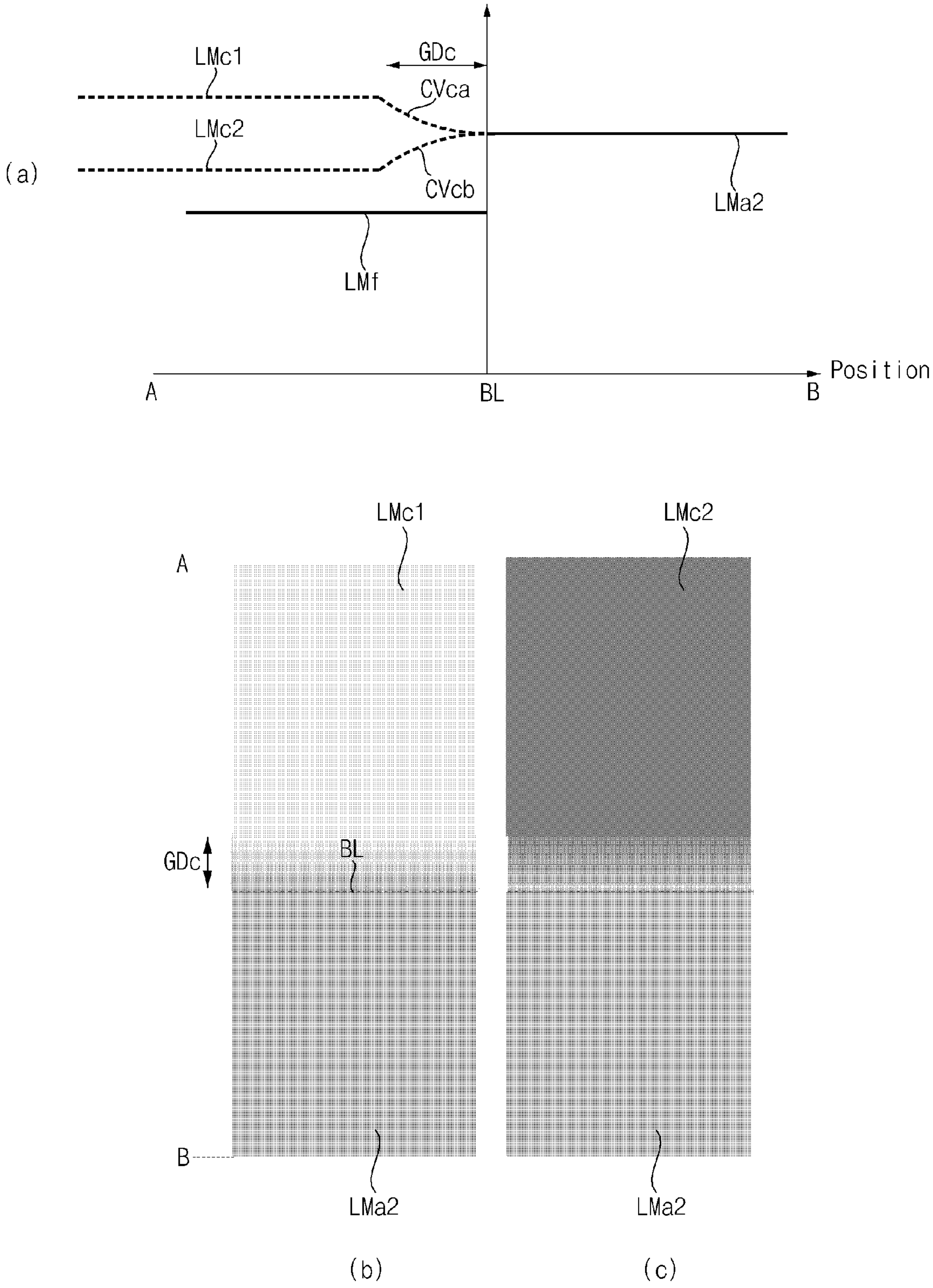

FIGS. 13A to 13C illustrate various examples of gradation processing on the boundary area BL between the first area Ara and the second area Arb of the display 180*m* of FIG. 12A.

When a top position of the display 180*m* is A, and a bottom position of the display 180*m* is B, FIG. 13A to FIG. 13C respectively illustrate a luminance level between the top and bottom of the display 180*m* and the like.

(a) of FIG. 13A illustrates an example of performing gradation processing in a direction from the boundary BL to the bottom position B of the display 180*m*.

As shown in (b) of FIG. 13A, when a luminance level of the first area Ara is Lma1 and is greater than a luminance level Lma2 of the second area Arb, the signal processing device 170 or the driving controller 285 may control gradation processing to be performed in the form of a curve CVaa that decreases in luminance level from the boundary BL toward the bottom position B of the display 180*m*. Accordingly, visibility of the boundary BL area between the first area Ara and the second area Arb to be increased.

As shown in (c) of FIG. 13A, when the luminance level of the first area Ara is Lma3 and is less than the luminance level Lma2 of the second area Arb, the signal processing device 170 or the driving controller 285 may control gradation processing to be processed in the form of a curve CVab that increases in luminance level from the boundary BL toward the bottom position B of the display 180*m*. Accordingly, visibility of the boundary BL area between the first area Ara and the second area Arb to be increased.

(a) of FIG. 13B illustrates an example of performing gradation processing at the boundary BL.

As shown in (b) of FIG. 13B, when a luminance level of the first area Ara is Lmb1 and is greater than a luminance level Lma2 of the second area Arb, the signal processing device 170 or the driving controller 285 may control gradation processing to be processed in the form of a curve CVba that increases in luminance level in a direction from the bottom position B of the display 180*m* to the top position A of the display 180*m* with respect to the boundary BL. Accordingly, visibility of the boundary BL area between the first area Ara and the second area Arb may be increased.

As shown in (c) of FIG. 13B, when the luminance level of the first area Ara is Lmb2 and is less than the luminance level Lma2 of the second area Arb, the signal processing device 170 or the driving controller 285 may control gradation processing to be processed in the form of a curve CVbb that decreases in luminance level in a direction from the bottom position B of the display 180*m* to the top position A of the display 180*m* with respect to the boundary BL. Accordingly, visibility of the boundary BL area between the first area Ara and the second area Arb may be increased.

(a) of FIG. 13C illustrates an example of performing gradation processing in a direction from the boundary BL to the top position A of the display 180*m*.

As shown in (b) of FIG. 13C, when a luminance level of the first area Ara is Lmc1 and is greater than a luminance level Lma2 of the second area Arb, the signal processing device 170 or the driving controller 285 may control gradation processing to be performed in the form of a curve CVca that increases in luminance level from the boundary BL toward the top position A of the display 180*m*. Accordingly, visibility of the boundary BL area between the first area Ara and the second area Arb may be increased.

As shown in (c) of FIG. 13C, when the luminance level of the first area Ara is Lmc2 and is less than the luminance level Lma2 of the second area Arb, the signal processing device 170 or the driving controller 285 may control gradation processing to be performed in the form of a curve CVcb that decreases in luminance level from the boundary BL toward the top position A of the display 180*m*. Accordingly, visibility of the boundary BL area between the first area Ara and the second area Arb may be increased.

Meanwhile, the signal processing device 170 or the driving controller 285 may control a pixel shift, a first direction line shift, or a second direction line shift to be performed when performing the first degradation compensation mode or the second degradation compensation mode.

Figure 13D:
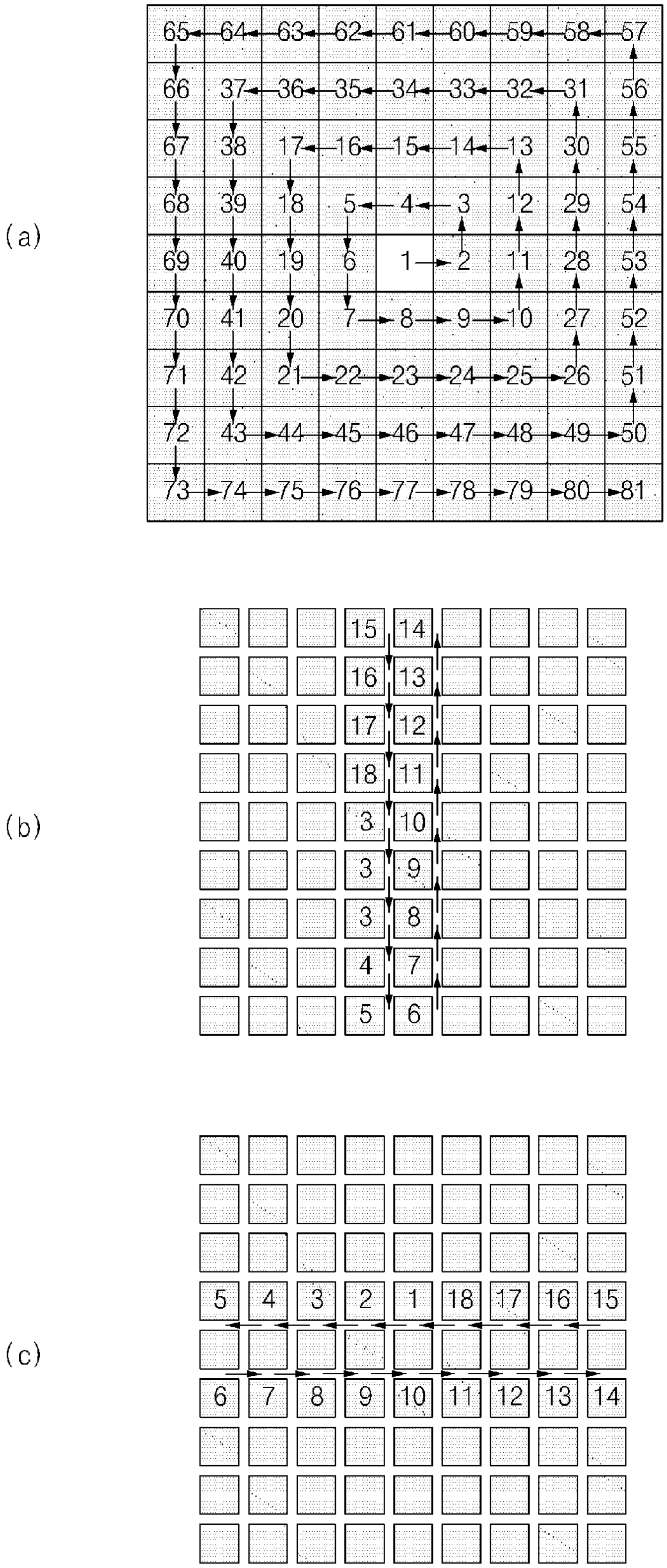

FIG. 13D illustrates various examples of degradation compensation such as a pixel shift and a line shift.

Referring to the drawing, when performing the first degradation compensation mode or the second degradation compensation mode, the signal processing device 170 or the driving controller 285 may control a pixel shift, as shown in (a) of FIG. 13D, a first direction line shift (a line shift along a first direction), as shown in (b) of FIG. 13D, or a second direction line shift (a line shift along a second direction), as shown in (c) of FIG. 13D, to be further performed. This allows degradation to be reduced.

As described above, a display apparatus for a vehicle according to an embodiment of the present disclosure includes: an organic light emitting diode (OLED) panel; a driving controller configured to output a driving signal to the OLED panel; a first temperature detector disposed in a first area of a rear surface of the OLED panel; a second temperature detector disposed in a second area of the rear surface of the OLED panel; and a signal processing device configured to perform a first degradation compensation mode or a second degradation compensation mode based on a difference between a first temperature detected by the first temperature detector and a second temperature detected by the second temperature detector, wherein the signal processing device is configured to control a luminance compensation value in the second degradation compensation mode to be greater than a luminance compensation value in the first degradation compensation mode. Accordingly, degradation may be reduced in an adaptive manner based on the temperature of each area of the panel.

Further, the signal processing device may be configured to control a luminance compensation value of the first area in the second degradation compensation mode to be different from a luminance compensation value of the second area in the second degradation compensation mode. Accordingly, degradation may be reduced in an adaptive manner based on the temperature of each area of the panel.

Further, the signal processing device may be configured to: perform the first degradation compensation mode in case in which a difference between a first temperature detected by the first temperature detector and a second temperature detected by the second detector is less than or equal to a reference value; and perform the second degradation compensation mode in case in which the difference is greater than the reference value. Accordingly, degradation may be reduced in an adaptive manner based on the temperature of each area of the panel.

Further, the signal processing device may be configured to: perform the second degradation compensation mode in case in which a difference between the first temperature and the second temperature exceeds a reference value; and control a luminance compensation value of the second area in the second degradation compensation mode to be greater than a luminance compensation value of the first area in the second degradation compensation mode. Accordingly, degradation may be reduced in an adaptive manner based on the temperature of each area of the panel.

Further, the signal processing device may be configured to: perform the second degradation compensation mode in case in which a difference between the first temperature and the second temperature exceeds a reference value and the second temperature is greater than the first temperature in a state in which a cumulative degradation amount of the first area is greater than a cumulative degradation amount of the second area; and control a luminance compensation value of the second area in the second degradation compensation mode to be greater than a luminance compensation value of the first area in the second degradation compensation mode. Accordingly, degradation may be reduced in an adaptive manner based on the temperature of each area of the panel.

Further, the signal processing device may be configured to: perform the second degradation compensation mode in case in which a difference between the first temperature and the second temperature exceeds a reference value and the first temperature is greater than the second temperature; and control a luminance compensation value of the first area in the second degradation compensation mode to be greater than a luminance compensation value of the second area in the second degradation compensation mode. Accordingly, degradation may be reduced in an adaptive manner based on the temperature of each area of the panel.

The signal processing device may be configured to perform the first degradation compensation mode in case in which a difference between a first temperature detected by the first temperature detector and a second temperature detected by the second temperature is less than or equal to a reference value in a state in which the first area is in an ON mode and the second area is in an OFF mode displayed at a first luminance level. Accordingly, degradation may be reduced based on the first degradation compensation mode.

In response to the first degradation compensation mode, the signal processing device may be configured to control the second area to be a second luminance level less than the first luminance level. Accordingly, degradation may be reduced based on the first degradation compensation mode.

The signal processing device may be configured to perform the second degradation compensation mode in case in which a difference between a first temperature detected by the first temperature detector and a second temperature detected by the second temperature detector exceeds a reference value in a state in which the first area is in an ON mode and the second area is in an OFF mode displayed at a first luminance level. Accordingly, degradation may be reduced in an adaptive manner based on the temperature of each area of the panel.

In response to the second degradation compensation mode, the signal processing device may be configured to control the second area to be a third luminance level less than the first luminance level. Accordingly, degradation may be reduced in an adaptive manner based on the temperature of each area of the panel.

Further, the signal processing device may be configured to: perform the second degradation compensation mode in case in which a difference between a first temperature detected by the first temperature and a second temperature detected by the second temperature exceeds a reference value and the second temperature is greater than the first temperature in a state in which the first area is in an ON mode and the second area is in an OFF mode displayed at a first luminance level; and control a luminance compensation value of the second area in the second degradation compensation mode to be greater than a luminance compensation value of the first area in the second degradation compensation mode. Accordingly, degradation may be reduced in an adaptive manner based on the temperature of each area of the panel.

Further, the signal processing device may be configured to: perform the second degradation compensation mode in case in which a difference between the first temperature and the second temperature exceeds a reference value and the first temperature is greater than the second temperature in a state in which the first area is in an ON mode and the second area is in an OFF mode displayed at a first luminance level; and control a luminance compensation value of the first area in the second degradation compensation mode to be greater than a luminance compensation value of the second area in the second degradation compensation mode. Accordingly, degradation may be reduced in an adaptive manner based on the temperature of each area of the panel.

Further, the signal processing device may be configured to perform the first degradation compensation mode in case in which the first area is in an ON mode and the second area is in an ON mode. Accordingly, degradation may be reduced based on the first degradation compensation mode.

The signal processing device may be configured to control the OLED panel to be turned off in case in which a difference between a first temperature detected by the first temperature detector and a second temperature detected by the second temperature detector exceeds an allowable value in a state in which the first area is in an ON mode and the second area is in an OFF mode displayed at a first luminance level, thereby protecting the panel.

Meanwhile, the display apparatus may further include a motor driver configured to adjust a height of the OLED panel. Thus, the height of the OLED panel may be adjusted.

Further, the signal processing device may be configured to: perform the first degradation compensation mode in response to a pop-up mode in which the height of the light emitting diode panel is a first height; and perform the second degradation compensation mode in case in which a difference between the first temperature and the second temperature exceeds a reference value and the first temperature is greater than the second temperature in a pop-down mode in which the height of the OLED panel is a second height. Accordingly, the height of the panel may be reduced, and degradation may be reduced based on the temperature of each area of the panel.

The signal processing device may be configured to control a luminance compensation value of the first area to be greater than a luminance compensation value of the second area in case in which a cumulative degradation amount of the first area is greater than a cumulative degradation amount of the second area while performing the first degradation compensation mode, and the signal processing device may be configured to control a luminance compensation value of the second area to be greater than a luminance compensation value of the first area in case in which a cumulative degradation amount of the second area is greater than a cumulative degradation amount of the first area while performing the first degradation compensation mode. Accordingly, degradation may be reduced based on the first degradation compensation mode.

When performing the first degradation compensation mode or the second degradation compensation mode, the signal processing device may be configured to perform a pixel shift, a first direction line shift, or a second direction line shift. Accordingly, degradation may be reduced.

When performing the first degradation compensation mode or the second degradation compensation mode, the signal processing device may be configured to perform luminance gradation processing on a third area including a boundary between the first area and the second area. Accordingly, visibility of the boundary area between the first area and the second area may be increased.

A display apparatus for a vehicle according to another embodiment of the present disclosure includes: an organic light emitting diode (OLED) panel; a driving controller configured to output a driving signal to the OLED panel; a first temperature detector disposed in a first area of a rear surface of the OLED panel; a second temperature detector disposed in a second area of the rear surface of the OLED panel; a motor driver configured to adjust a height of the OLED panel; and a signal processing device configured to perform a first degradation compensation mode in response to a pop-up mode in which the height of the OLED panel is a first height, and, in a pop-down mode in which the height of the OLED panel is a second height, perform a second degradation compensation mode in case in which a difference between a first temperature detected by the first temperature detector and a second temperature detected by the second temperature detector exceeds a reference value and the first temperature is greater than the second temperature. Accordingly, degradation may be reduced based on the temperature of each area of the panel.

A display apparatus for a vehicle according to yet another embodiment of the present disclosure includes: an organic light emitting diode (OLED) panel; a driving controller configured to output a driving signal to the OLED panel; a first temperature detector disposed in a first area of a rear surface of the OLED panel; a second temperature detector disposed in a second area of the rear surface of the OLED panel; a third temperature detector disposed in a third area of the rear surface of the OLED panel; and a signal processing device configured to perform a first degradation compensation mode or a second degradation compensation mode, based on a difference in respective temperatures detected by the first to third temperature detectors, wherein the signal processing device is further configured to control a luminance compensation value in the second degradation compensation mode to be greater than a luminance compensation value in the first degradation compensation mode. Accordingly, degradation may be reduced based on the temperature of each area of the panel.

It will be apparent that, although the preferred embodiments have been shown and described above, the present disclosure is not limited to the above-described specific embodiments, and various modifications and variations can be made by those skilled in the art without departing from the scope of the appended claims. Thus, it is intended that the modifications and variations should not be understood independently of the technical spirit or prospect of the present disclosure.

What is claimed is:

1. A display apparatus for a vehicle, the display apparatus comprising:

an organic light emitting diode (OLED) panel;

a driving controller configured to output a driving signal to the OLED panel;

a first temperature detector disposed in a first area of a rear surface of the OLED panel;

a second temperature detector disposed in a second area of the rear surface of the OLED panel;

a signal processing device configured to perform a first degradation compensation mode or a second degradation compensation mode, based on a difference between a first temperature detected by the first temperature detector and a second temperature detected by the second temperature detector; and a motor driver configured to adjust a height of the OLED panel, wherein, based on an operation of motor driver, the OLED panel is configured to operate in a first mode in which the second temperature detector is disposed above a dashboard, or operate in a second mode in which the second temperature detector is not exposed above the dashboard and disposed under the dashboard, wherein the signal processing device is configured to:

in response to the OLED panel being the first mode, determine whether the first degradation compensation mode is performed or not based on cumulative degradation amount of the first area and the second area, in response to the OLED panel being the second mode, determine whether the second degradation compensation mode is performed or not based on cumulative degradation amount of the first area and the second area and the difference between the first temperature and the second temperature, and control a luminance compensation value in the second degradation compensation mode to be greater than a luminance compensation value in the first degradation compensation mode.

2. The display apparatus of claim 1, wherein the signal processing device is configured to control a luminance compensation value of the first area in the second degradation compensation mode to be different from a luminance compensation value of the second area in the second degradation compensation mode.

3. The display apparatus of claim 1, wherein the signal processing device is configured to:

perform the first degradation compensation mode in case in which the difference between the first temperature detected by the first temperature detector and the second temperature detected by the second temperature detector is less than or equal to a reference value; and perform the second degradation compensation mode in case in which the difference is greater than the reference value.

4. The display apparatus of claim 1, wherein the signal processing device is configured to:

perform the second degradation compensation mode in case in which the difference between the first temperature and the second temperature exceeds a reference value; and control a luminance compensation value of the second area in the second degradation compensation mode to be greater than a luminance compensation value of the first area in the second degradation compensation mode.

5. The display apparatus of claim 1, wherein the signal processing device is configured to:

perform the second degradation compensation mode in case in which the difference between the first temperature and the second temperature exceeds a reference value and the second temperature is greater than the first temperature in a state in which a cumulative degradation amount of the first area is greater than a cumulative degradation amount of the second area; and control a luminance compensation value of the second area in the second degradation compensation mode to be greater than a luminance compensation value of the first area in the second degradation compensation mode.

6. The display apparatus of claim 1, wherein the signal processing device is configured to:

perform the second degradation compensation mode in case in which the difference between the first temperature and the second temperature exceeds a reference value and the first temperature is greater than the second temperature; and control a luminance compensation value of the first area in the second degradation compensation mode to be greater than a luminance compensation value of the second area in the second degradation compensation mode.

7. The display apparatus of claim 1, wherein the signal processing device is configured to perform the first degradation compensation mode in case in which the difference between the first temperature detected by the first temperature detector and the second temperature detected by the second temperature is less than or equal to a reference value in a state in which the first area is in an ON mode and the second area is in an OFF mode displayed at a first luminance level, wherein, in response to the first degradation compensation mode, the signal processing device is configured to control the second area to be a second luminance level less than the first luminance level.

8. The display apparatus of claim 1, wherein the signal processing device is configured to perform the second degradation compensation mode in case in which the difference between the first temperature detected by the first temperature detector and the second temperature detected by the second temperature detector exceeds a reference value in a state in which the first area is in an ON mode and the second area is in an OFF mode displayed at a first luminance level.

9. The display apparatus of claim 8, wherein, in response to the second degradation compensation mode, the signal processing device is configured to control the second area to be a third luminance level less than the first luminance level.

10. The display apparatus of claim 1, wherein the signal processing device is configured to:

perform the second degradation compensation mode in case in which the difference between the first temperature detected by the first temperature and the second temperature detected by the second temperature exceeds a reference value and the second temperature is greater than the first temperature in a state in which the first area is in an ON mode and the second area is in an OFF mode displayed at a first luminance level; and control a luminance compensation value of the second area in the second degradation compensation mode to be greater than a luminance compensation value of the first area in the second degradation compensation mode.

11. The display apparatus of claim 1, wherein the signal processing device is configured to:

perform the second degradation compensation mode in case in which the difference between the first temperature and the second temperature exceeds a reference value and the first temperature is greater than the second temperature in a state in which the first area is in an ON mode and the second area is in an OFF mode displayed at a first luminance level; and control a luminance compensation value of the first area in the second degradation compensation mode to be greater than a luminance compensation value of the second area in the second degradation compensation mode.

12. The display apparatus of claim 1, wherein the signal processing device is configured to control the OLED panel to be turned off in case in which the difference between the first temperature detected by the first temperature detector and the second temperature detected by the second temperature detector exceeds an allowable value in a state in which the first area is in an ON mode and the second area is in an OFF mode displayed at a first luminance level.

13. The display apparatus of claim 1, wherein the signal processing device is configured to:

control a luminance compensation value of the first area to be greater than a luminance compensation value of the second area in case in which a cumulative degradation amount of the first area is greater than a cumulative degradation amount of the second area while performing the first degradation compensation mode; and control a luminance compensation value of the second area to be greater than a luminance compensation value of the first area in case in which a cumulative degradation amount of the second area is greater than a cumulative degradation amount of the first area while performing the first degradation compensation mode.

14. The display apparatus of claim 1, wherein, when performing the first degradation compensation mode or the second degradation compensation mode, the signal processing device is configured to perform a pixel shift, a first direction line shift, or a second direction line shift.

15. The display apparatus of claim 1, wherein, when performing the first degradation compensation mode or the second degradation compensation mode, the signal processing device is configured to perform luminance gradation processing on a third area including a boundary between the first area and the second area.

16. A display apparatus for a vehicle, the display apparatus comprising:

an organic light emitting diode (OLED) panel;

a driving controller configured to output a driving signal to the OLED panel;

a first temperature detector disposed in a first area of a rear surface of the OLED panel;

a second temperature detector disposed in a second area of the rear surface of the OLED panel;

a signal processing device configured to perform a first degradation compensation mode or a second degradation compensation mode, based on a difference between a first temperature detected by the first temperature detector and a second temperature detected by the second temperature detector; and a motor driver configured to adjust a height of the OLED panel, wherein the signal processing device is configured to control a luminance compensation value in the second degradation compensation mode to be greater than a luminance compensation value in the first degradation compensation mode, wherein the signal processing device is configured to:

perform the first degradation compensation mode in response to a pop-up mode in which the height of the light emitting diode panel is a first height; and perform the second degradation compensation mode in case in which the difference between the first temperature and the second temperature exceeds a reference value and the first temperature is greater than the second temperature in a pop-down mode in which the height of the OLED panel is a second height.

17. The display apparatus of claim 16, wherein in response to the OLED panel being the pop-up mode, the signal processing device is configured to increase or decrease luminance level step by step in the first degradation compensation mode as a distance from boundary between the first area and the second area.

18. The display apparatus of claim 16, wherein the signal processing device is configured to control the luminance compensation value more based on the difference between the first temperature and the second temperature in the second degradation compensation mode than in the first degradation compensation mode.

19. The display apparatus of claim 16, wherein in response to a pop-up mode in which a height of the OLED panel is a first height, the second temperature detector is disposed above a dashboard, wherein in response to a pop-down mode in which the height of the OLED panel is a second height less than the first height, the second temperature detector is not exposed above the dashboard but disposed under the dashboard.

20. A display apparatus for a vehicle, the display apparatus comprising:

an organic light emitting diode (OLED) panel;

a driving controller configured to output a driving signal to the OLED panel;

a first temperature detector disposed in a first area of a rear surface of the OLED panel;

a second temperature detector disposed in a second area of the rear surface of the OLED panel;

a signal processing device configured to perform a first degradation compensation mode or a second degradation compensation mode, based on a difference between a first temperature detected by the first temperature detector and a second temperature detected by the second temperature detector; and a motor driver configured to adjust a height of the OLED panel, wherein, based on an operation of motor driver, the OLED panel is configured to operate in a first mode in which the second temperature detector is disposed above a dashboard, or operate in a second mode in which the second temperature detector is not exposed above the dashboard and disposed under the dashboard, wherein the signal processing device is configured to control a degradation compensation mode in the second mode to be different from a degradation compensation mode in the first mode.

* * * * *